United States Patent
Du et al.

(10) Patent No.: US 9,806,911 B2
(45) Date of Patent: Oct. 31, 2017

(54) DISTRIBUTED VIRTUAL GATEWAY APPLIANCE

(71) Applicant: INTERNATIONAL BUSINESS MACHINES CORPORATION, Armonk, NY (US)

(72) Inventors: Kai Hong Du, Shanghai (CN); Xiao Jian Nie, Shanghai (CN); Shashi Pratap Singh, Shanghai (CN); Xiao Li Xu, Shanghai (CN); Ying Lin Xu, Nanjing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 161 days.

(21) Appl. No.: 14/929,745

(22) Filed: Nov. 2, 2015

(65) Prior Publication Data
US 2017/0126436 A1 May 4, 2017

(51) Int. Cl.
*H04L 12/66* (2006.01)
*H04L 12/947* (2013.01)
*H04L 12/721* (2013.01)
*H04L 12/931* (2013.01)

(52) U.S. Cl.
CPC ............ *H04L 12/66* (2013.01); *H04L 45/66* (2013.01); *H04L 49/25* (2013.01); *H04L 49/503* (2013.01)

(58) Field of Classification Search
CPC ......... H04L 12/66; H04L 41/06; H04L 41/25; H04L 41/503; H04L 49/25; H04L 49/503; H04L 49/552; H04L 49/557; H04L 45/66; H04L 69/40
See application file for complete search history.

(56) References Cited

U.S. PATENT DOCUMENTS

| | | | |
|---|---|---|---|
| 7,152,179 B1* | 12/2006 | Critchfield | H04L 12/56 714/4.11 |
| 8,665,886 B2 | 3/2014 | Gupta et al. | |
| 2014/0233569 A1 | 8/2014 | Yong et al. | |
| 2014/0307744 A1 | 10/2014 | Dunbar et al. | |
| 2014/0372582 A1 | 12/2014 | Ghanwani et al. | |
| 2015/0003458 A1 | 1/2015 | Li et al. | |
| 2015/0124809 A1* | 5/2015 | Edsall | H04L 45/74 370/390 |

(Continued)

OTHER PUBLICATIONS

T. Narten, E. Gray; D. Black, L. Fang, L. Kreeger, M. Napierala; "Problem Statement: Overlays for Network Virtualization" Oct. 2014.

(Continued)

*Primary Examiner* — Habte Mered
(74) *Attorney, Agent, or Firm* — Isaac Gooshaw; Hye Jin Lucy Song; Heslin Rothenberg Farley & Mesiti PC

(57) ABSTRACT

Methods, computer program products, and systems are presented. The methods include, for instance: providing a distributed virtual gateway for Network Virtualization over Layer 3 (NVO3) network. A gateway stack having three or more nodes is implemented as a distributed virtual gateway, providing Layer 2 or Layer 3 gateway services in a fail-safe manner. Nodes of the gateway stack are configured to autonomously process and forward inbound NVO3 data packets with known destination addresses without engaging a master of the gateway stack.

20 Claims, 17 Drawing Sheets

(56) References Cited

U.S. PATENT DOCUMENTS

| | | | |
|---|---|---|---|
| 2016/0085560 A1* | 3/2016 | Gourlay | G06F 9/4416 713/2 |
| 2017/0085488 A1* | 3/2017 | Bhattacharya | H04L 47/2425 |
| 2017/0118067 A1* | 4/2017 | Vedula | H04L 41/0668 |

OTHER PUBLICATIONS

T. Narten, E. Gray, D. Black, L. Fang, L. Kreeger, M. Napierala; "Problem Statement: Overlays for Network Virtualization" Oct. 2014.

Teemu Koponen, Keith Amidon, Peter Boland, Martin Casado et. al; Network Virtualization in Multi-Tenant Datacenters Apr. 2, 2014.

Mel, Peter; Grance, Timothy; The NIST Definition of Cloud Computing; NIST Special Publication 800-145; Sep. 2011 Sep. 2011.

* cited by examiner

790

| | B0 | B1 | B2 | B3 |
|---|---|---|---|---|
| R0 | VersionNo | PacketType | PacketLength | |
| R4 | MgmtIP | | | |
| R8 | Checksum | | AuthType | |
| R12 | (Authentication) | | | |
| R16 | NetMask | | | |
| R20 | HelloInterval | | Options | GwPriority |
| R24 | DeadInterval | | | |
| R28 | VirtualIP | | | |
| R32 | BackupIP | | | |
| R36 | MasterIP | | | |
| R40 | Neighbor | | | |
| R44 | ... | | | |

FIG. 7B

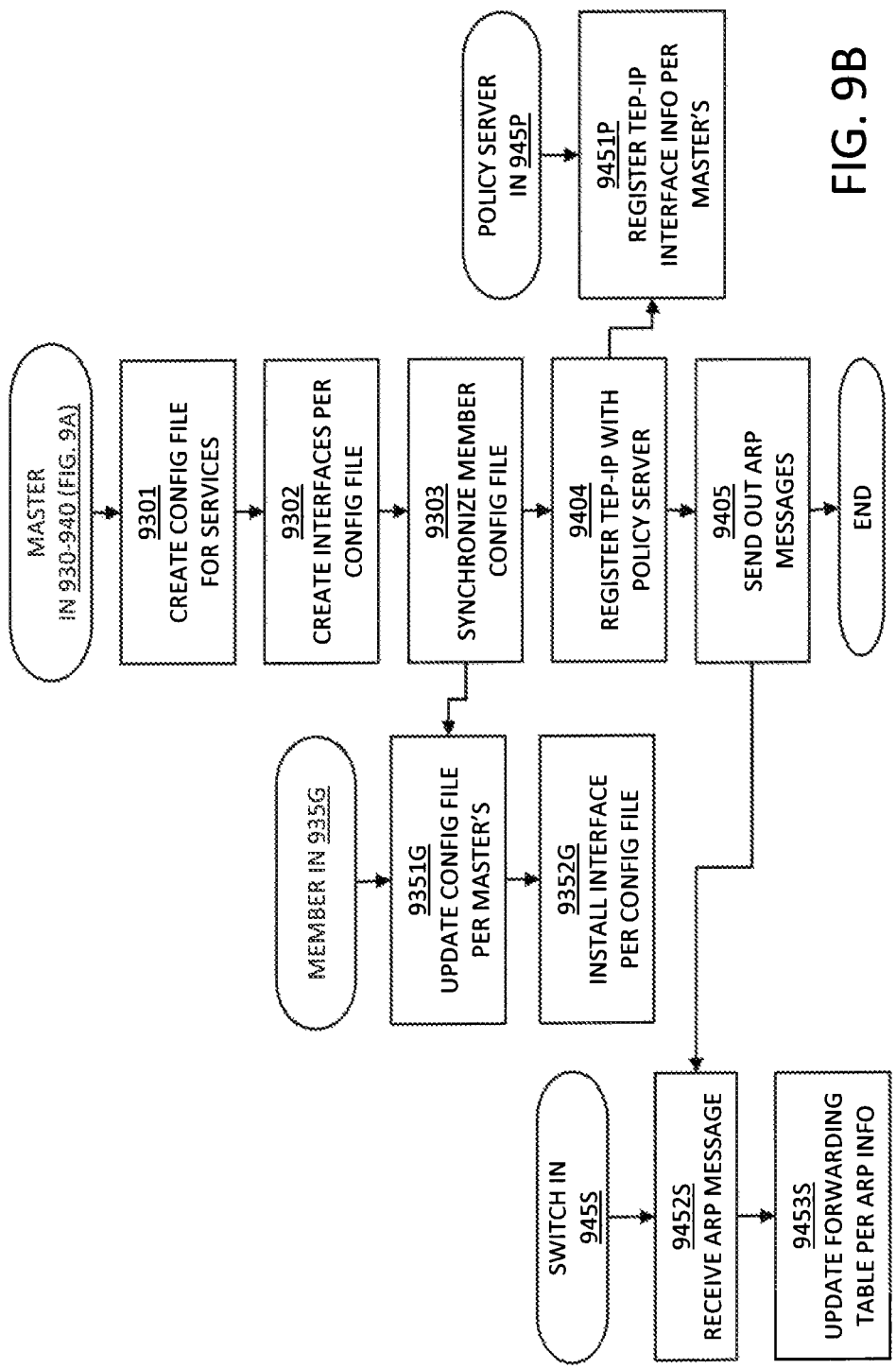

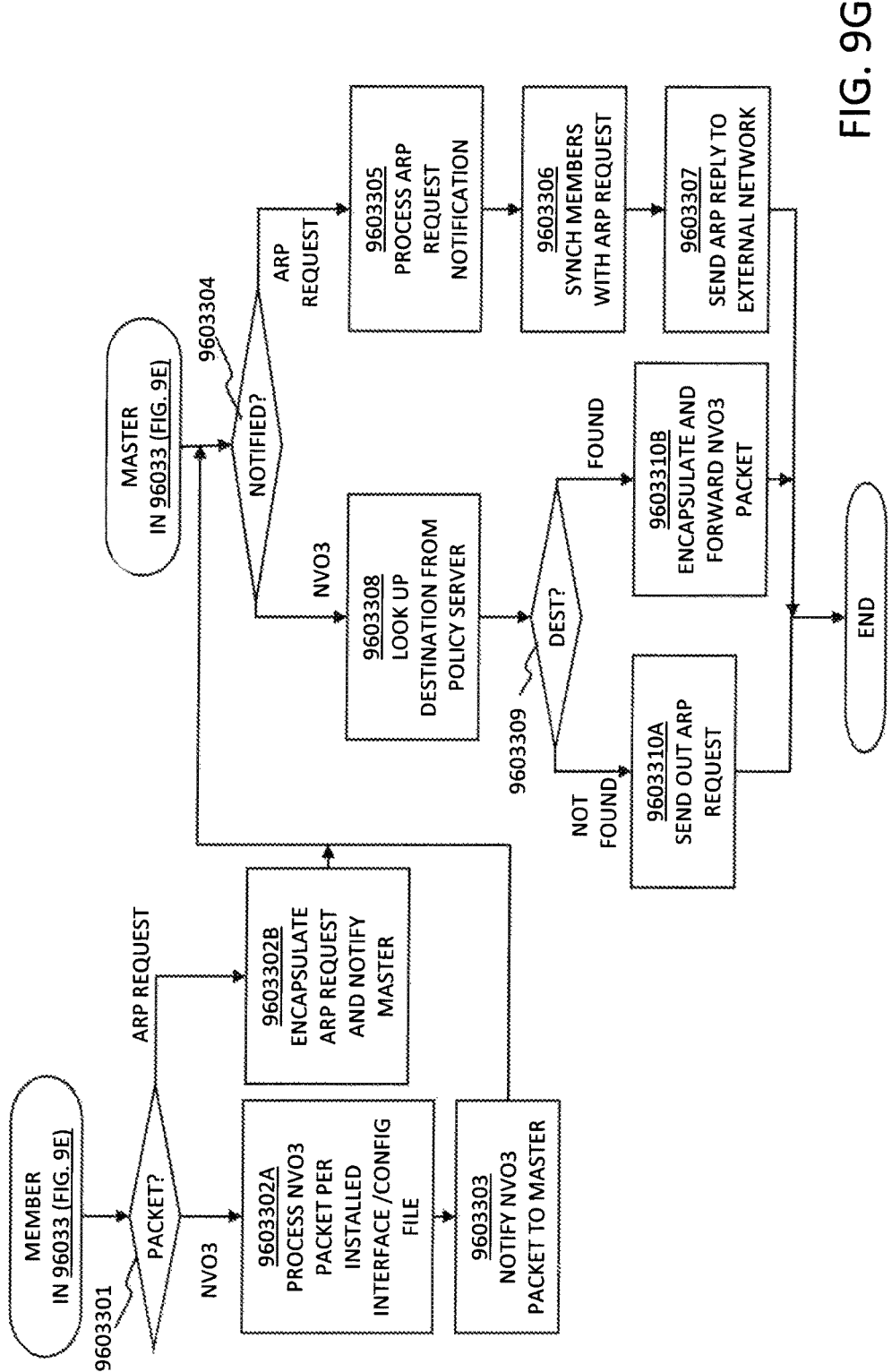

DISTRIBUTED VIRTUAL GATEWAY APPLIANCE

TECHNICAL FIELD

The present disclosure relates to virtualized resource optimization, including networking and computing resources, and more particularly to methods, computer program products, and systems for providing a virtualized network environment by use of a coordinated group of multiple gateways.

BACKGROUND

Network Virtualization over Layer 3 (NVO3) is a technological framework in cloud computing and network virtualization, referring to an overlay network that provides a Layer 2 (L2) or Layer 3 (L3) service to Tenant Systems over an L3 underlay network using the architecture and protocols as defined by the Internet Engineering Task Force (IETF) NVO3 task force.

L2 and L3 respectively refer to Layer 2 (Data Link Layer) and Layer 3 (Network Layer) services of the Open Systems Interconnection model (OSI Model) comprising 7 layers. The Network Layer (L3) utilizes a data unit of packet, also referred to as a datagram. L3 functions may include structuring and managing a multimode network, including addressing, routing and traffic control. Some examples of L3 protocols are Internet Protocol version 4 (IPv4), Internet Protocol version 6 (IPv6), Internet Protocol Security (IPsec), Datagram Delivery Protocol (DDP) in the AppleTalk suite, and Internet Control Message Protocol (ICMP). The Data Link Layer (L2) utilizes a data unit of bit/frame, to provide services of reliable transmission of data frames between two nodes connected by a physical layer. Some examples of L2 protocols are Point-to-Point Protocol (PPP), IEEE 802.2 Logical Link Control (LLC), Layer 2 Tunneling Protocol (L2TP), and Media Access Control (MAC).

An NVO3 network may be separated from a traditional datacenter network and the Internet. A device and/or a system that connect the NVO3 network with the traditional datacenter network and the Internet should function as a gateway that interfaces with another network using different protocols. Some examples of gateway functionalities include, but are not limited to, protocol conversion, routing, impedance adjustment, rate conversion, fault isolation, signal translation, and any other functionality that negotiates differences amongst networks coupled to the gateway, making the networks interoperable, such as mutually acceptable administrative procedures for both networks, etc. In this specification, one or more computer program that is configured to perform some of aforementioned gateway functionalities is referred to as a gateway, and the gateway runs on a computer system.

As the gateway functionalities are critical in cross-network data communication, the Virtual Router Redundancy Protocol (VRRP) is currently employed to provide uninterrupted gateway functionalities across networks by providing a redundant gateway that may take over a main gateway in case of a failure on the main gateway.

SUMMARY

A method for providing a distributed virtual gateway for Network Virtualization over Layer 3 (NVO3) network, the method comprises: forming a gateway stack (GS) comprising at least three (3) nodes, wherein the GS is an instance of the distributed virtual gateway, wherein the GS is formed amongst the nodes pursuant to a gateway stack protocol (GSP) running on each of the nodes, such that the GS provides Layer 2 or Layer 3 gateway services in a fail-safe manner by utilizing all of the nodes in the GS, wherein the formed GS has a master, a backup, and at least one slave respectively elected for each of the nodes, and wherein the master communicates with a controller and a policy server via a management interface, and the GS is coupled to a switch via a data interface; registering the GS with the controller and the policy server such that the controller keeps GS registration information data, and the policy server keeps policy server list information data; configuring the nodes of the registered GS such that all nodes are enabled to autonomously process an inbound NVO3 data packet having a destination address known to a receiving node; and operating the GS, responsive to an associated type of a data packet and respective changes in an environment of the GS, wherein the data interface between the GS and the switch is aggregated by static trunk such that the switch evenly distributes inbound data packets amongst the nodes of the GS.

Additional features are realized through the techniques set forth herein. Other embodiments and aspects, including but not limited to computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 7B depicts a format of a Hello Packet used for the Hello Protocol described in FIG. 7A, in accordance with one or more embodiments set forth herein;

FIG. 9B is a detailed flowchart of blocks 930 and 940 in FIG. 9A, as well as all blocks communicating with blocks 930 and 940, depicting how configuration and interface information is handled by the master and members of the GS, the policy server and the switch, in accordance with one or more embodiments set forth herein;

FIG. 9G is a detailed flowchart of block 96033 of FIG. 9E, depicting how cross-network traffic is handled by the GS as performed by the master and a member, in accordance with one or more embodiments set forth herein.

DETAILED DESCRIPTION

Aspects of the present disclosure and certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the disclosure in detail. It should be understood, however, that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure.

The present disclosure provides, in part, methods, computer program products, systems, network devices, and virtual machine management software for a distributed virtual gateway.

Reference is made below to the drawings, which are not drawn to scale for ease of understanding, wherein the same reference numbers used throughout different figures designate the same or similar components.

Figure 1:
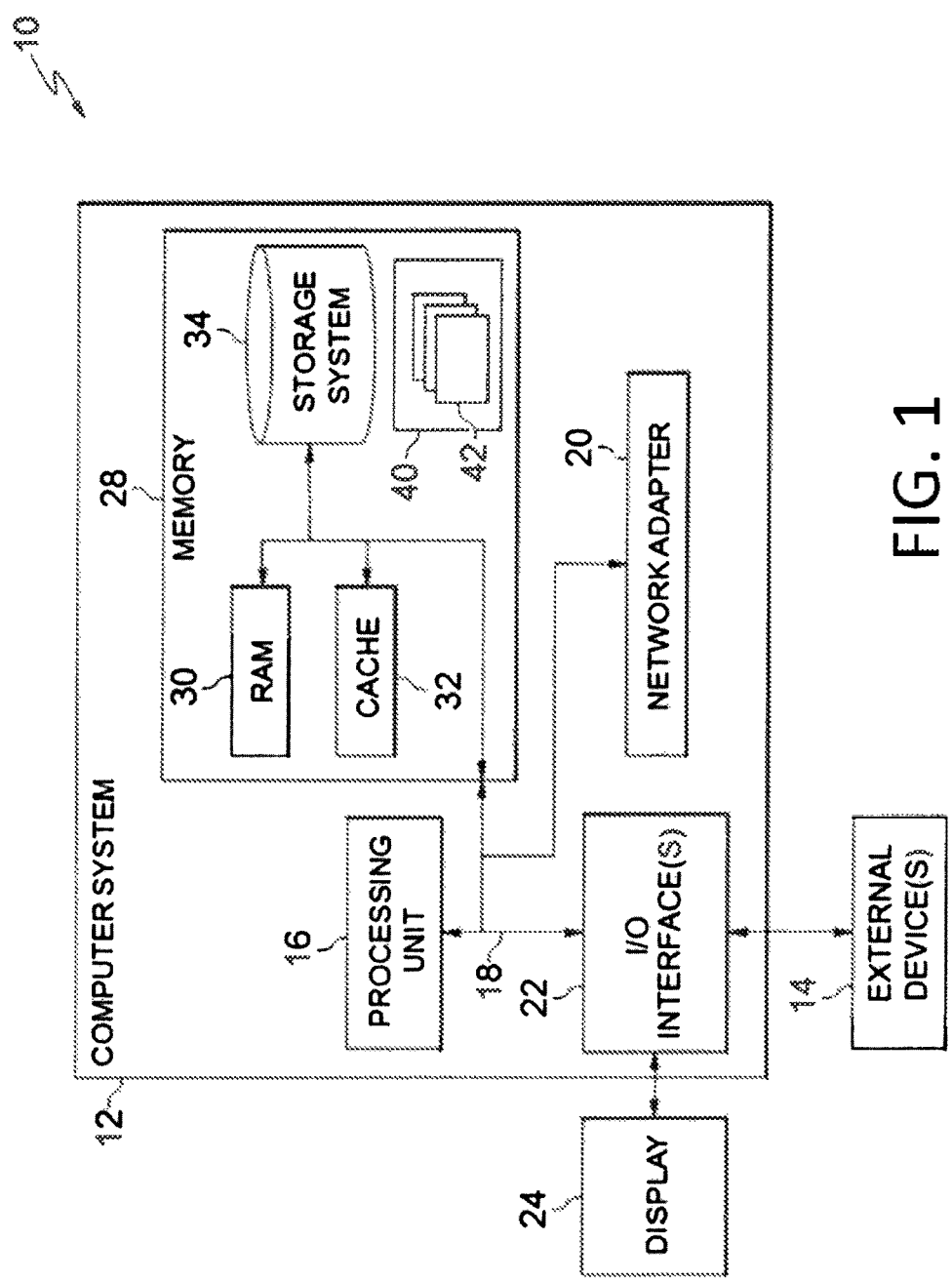
FIG. 1 depicts a cloud computing node in accordance with one or more embodiments set forth herein.
Figure 2:
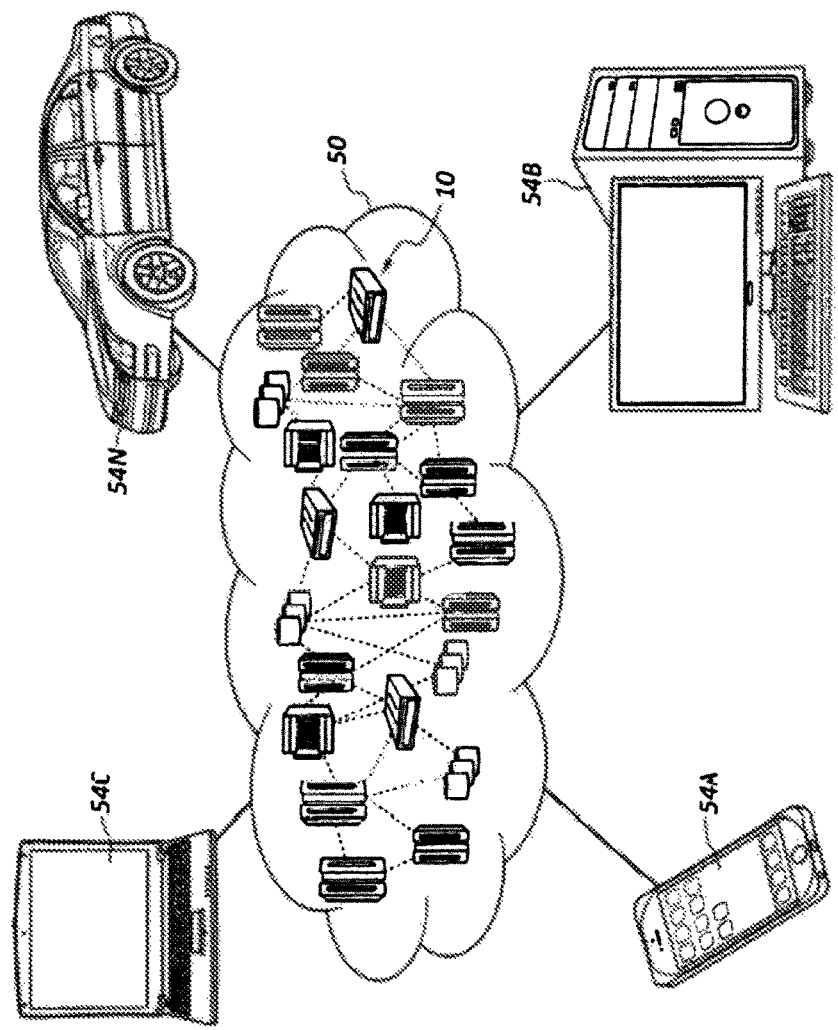
FIG. 2 depicts a cloud computing environment in accordance with one or more embodiments set forth herein.
Figure 3:
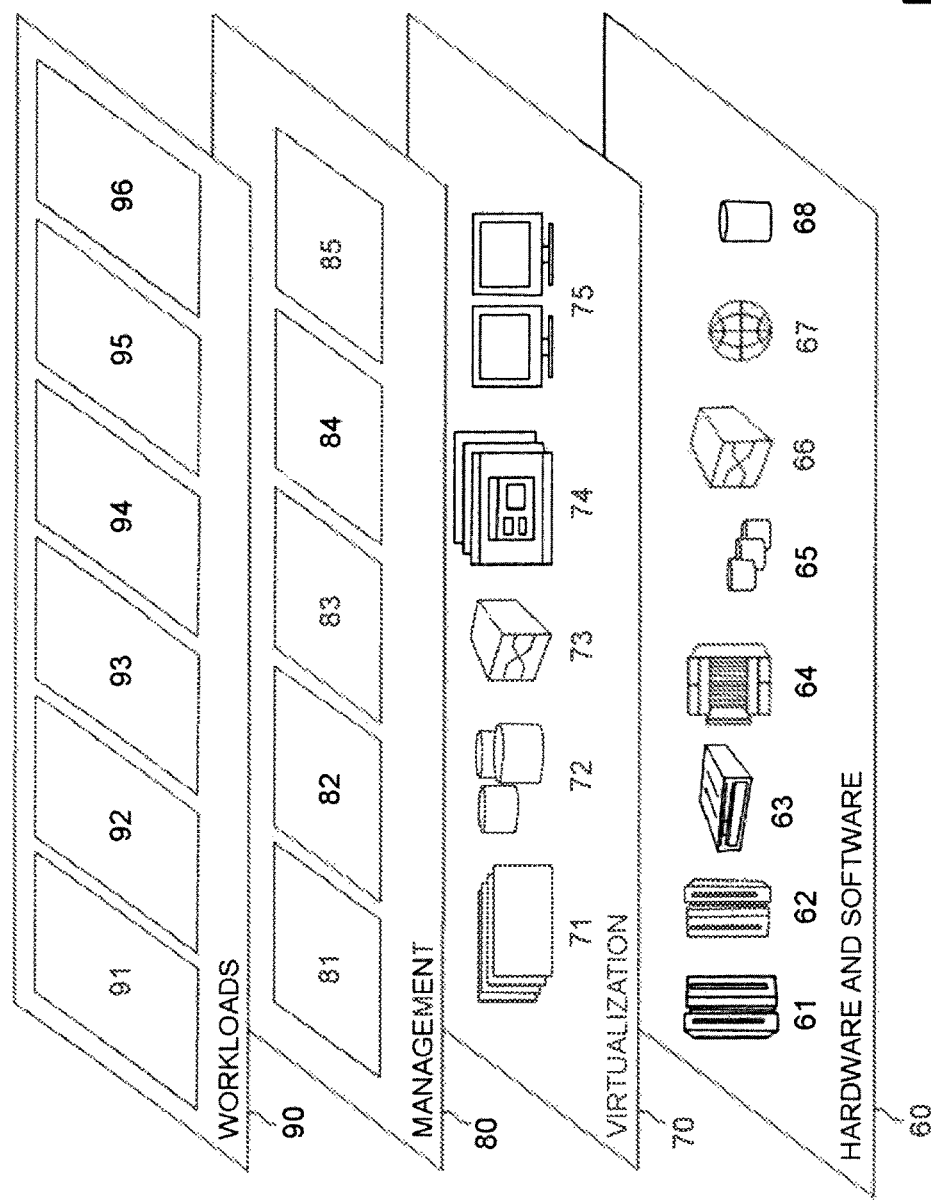
FIG. 3 depicts abstraction model layers in accordance with one or more embodiments set forth herein.

FIGS. 1-3 depict various aspects of computing, including cloud computing, in accordance with one or more embodiments set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in cloud computing node 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a distributed virtual gateway processing 96 as described herein.

Program/utility 40 as set forth in FIG. 1 can provide the functionality of the distributed virtual gateway processing 96 as set forth in FIG. 3. The distributed virtual gateway processing 96 may be a component of the virtualization layer 70.

Referring again to FIG. 1:

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
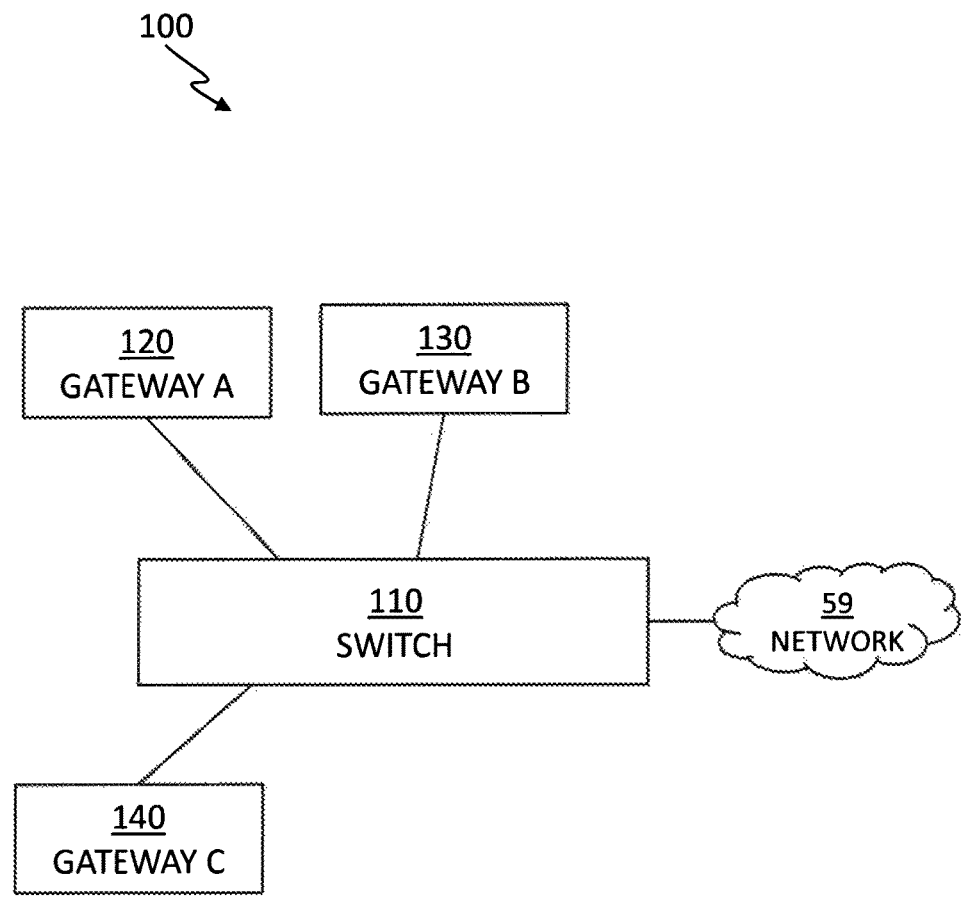
FIG. 4 depicts a physical topology for hardware components of a gateway stack, in accordance with one or more embodiments set forth herein.

FIG. 4 depicts a physical topology for hardware components of a gateway stack (GS) 100, in accordance with one or more embodiments set forth herein.

The GS 100 includes a switch 110, gateway A 120, gateway B 130, gateway C 140, and network 59.

The switch 110 is a network switch to interconnect the gateway A 120, the gateway B 130, the gateway C 140, and the network 50 of FIG. 2, by use of respective ports of the switch 110. The switch 110 uses hardware addresses, also referred to as Media Access Control (MAC) addresses, or physical addresses, to process and forward data at the Data Link Layer (L2) of the OSI model. In this specification, the switch 110 is an instance of a Layer 3 switch, or a multilayer switch, which is capable of processing data at the Network Layer (L3) by additional routing functionality that typically uses Internet Protocol (IP) addresses to perform packet forwarding, by use of a forwarding table.

The gateway A 120, the gateway B 130, and the gateway C 140 represent multiple gateways employed in the GS 100, particularly three or more physical gateway appliances according to one embodiment of the present invention. In this specification, term "gateway appliance" refers to a piece of a physical computer system that functions as a gateway. Typical gateway appliances have hardware and software configurations that were pre-set by a manufacturer such that a user may easily use the gateway appliance with minimal administrative effort. In this specification, while terms "gateway" and "node" may interchangeably indicate both a physical and/or a logical gateway, the term "gateway appliance" exclusively refers to a piece of a physical computer system functioning as a gateway.

The network 50 of FIG. 2 depicts a physical network external to a private network represented by the gateway A 120, the gateway B 130, and the gateway C 140. See description of FIG. 2 for details of the network 50.

Figure 5:
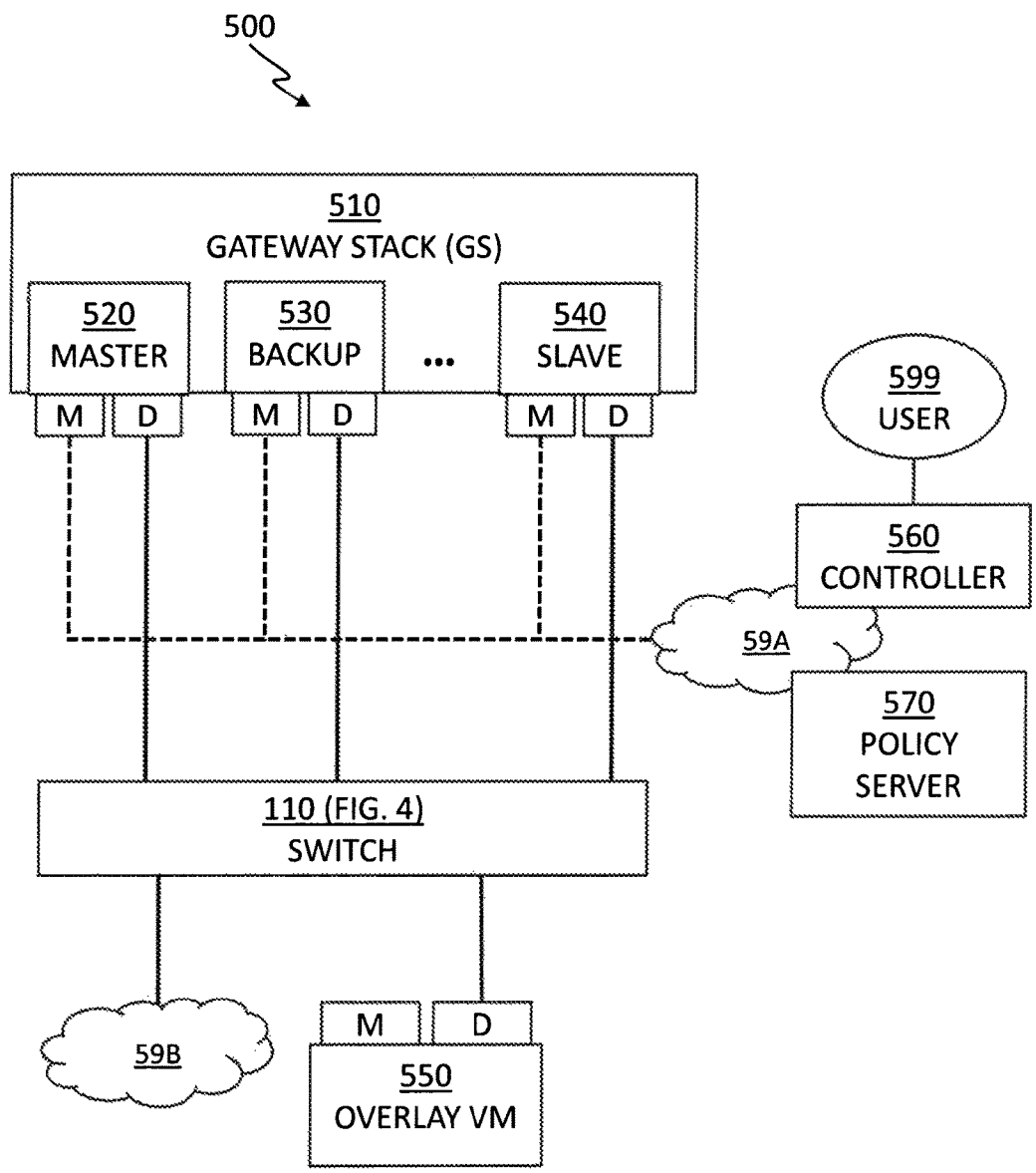
FIG. 5 depicts a system comprising physical and logical components of a gateway stack, in accordance with one or more embodiments set forth herein.

FIG. 5 depicts a system 500 comprising physical and logical components of a gateway stack (GS) 510, in accordance with one or more embodiments set forth herein.

Because gateway functionalities are critical in cross-network data communication, the Virtual Router Redundancy Protocol (VRRP) is conventionally employed to provide uninterrupted gateway functionalities across networks by providing a redundant gateway that may take over a main gateway in case of a failure on the main gateway. Whilst the VRRP provides a dependable fail-safe mechanism, the VRRP utilizes only fifty percent (50%) of resources deployed for the gateway, including computer systems, computer programs, network bandwidth, etc. Also, because the VRRP supports only two (2) gateway setups having a master and a slave, and because the master provides gateway functionalities alone until the master suffers a failure, thence the slave takes over and services networks alone as previously done by the master, the volume of communication is bound by the network bandwidth that can be processed by one server that services as the gateway at the time, that is either the master or the slave, but not both at one time. Also, because the master/slave mode of the VRRP does not support a multi-node configuration, no fail-safe gateway services are available when the master and the slave both fail. The system 500 advantageously addresses the problems set forth as above.

The system 500 includes the GS 510, a first network 59A, a second network 59B, an overlay virtual machine (VM) 550, and the switch 110 of FIG. 4, which provides physical connections for data communication amongst the GS 510, the second network 50B, and the overlay VM 550. The first network 59A and the second network 59B are respective instances of the network 59 of FIG. 4.

The GS 510 includes a master 520, a backup 530, and a slave 540 of one or more slaves of the GS 510. The gateways 520, 530, and 540 are physically linked to the switch 110 as shown in FIG. 4, and the master 520, the backup 530, and the slave 540 respectively refer to roles within the GS 510, as assigned to each gateway after the GS 510 is formed according to the processes presented hereinafter. See description of FIGS. 6A, 6B, 7A, and 7B for details of GS formation. In this specification, the master 520 of the GS 510 performs a unique set of functions exclusive for the master 520, and, to distinguish the master 520 from the rest of gateways in the GS 510, the term "member" is used hereinafter to indicate the gateways of the GS 510 other than the master 520. See descriptions of FIGS. 6A, 6B, 7A, 7B, 8, 9A, 9B, 9C, 9D, 9E, 9F, and 9G for details of process flow and operations of the GS 510.

The GS 510 is a logical gateway device that operates at any network layer in the OSI model and communicates using more than one protocol, converting protocols according to configuration as in conventional gateways. Particularly, the GS 510 virtualizes a network over Layer 3, as noted in this specification a Network Virtualization Over Layer 3 (NVO3) gateway, such that the network linked to the GS 510 may not be aware that the network is carrying NVO3 packets. The network is referred to as an underlay network, and carries such NVO3 packets as encapsulated as a result of tunneling. The underlay network may use a protocol and address completely different from a protocol and address of the overlay. According to one or more aspects of this specification, the underlay network of the NVO3 gateway, that is the GS 510, is IP at Layer 3. See descriptions of FIGS. 9A, 9C, 9E, 9F, and 9G for details of NVO3 packet process.

The gateways 520, 530, and 540 of the GS 510 include a management port (M) and at least one data port (D). Each management port 520:M, 530:M, and 540:M, is coupled to the first network 50A such that the gateways 520, 530, and 540 of the GS 510 communicate with a controller 560 within the first network 50A for administrative purposes related to registration and configuration of the GS 510. The controller 560 is an interface between the GS 510 and a user 599, who has administrative control over the GS 510 such as enabling the GS 510. A policy server 570 within the first network 50A stores registration information and interface information of the GS 510.

As the GS 510 is one logical gateway regardless of the number of physical gateways participating in the GS 510, individual gateways 520, 530, and 540 of the GS 510 are invisible to the second network 50B and the overlay VM 550, which attempt to communicate with destination computer systems in a network serviced by the GS 510 using at least one overlay protocol that needs tunneling. Each data port 520:D, 530:D, and 540:D coupled to the switch 110 handles data traffic according to the configuration of and interfaces set for the GS 510. The ports on the switch 110 connecting data ports 520:D, 530:D, and 540:D are aggregated by a static trunk such that data traffic incoming to the GS 510 is distributed over the data ports 520:D, 530:D, and 540:D of the GS 510. Also, wherein there is more than one data port in gateways, 520, 530, and 540, to distribute the upload data traffic over all available data ports, various techniques of network bounding may be used. Examples of link aggregation techniques may be, but are not limited to, the Institute of Electrical and Electronics Engineers (IEEE) 802.1AX-2008 standard, the IEEE specification of the Link Aggregation Control Protocol (LACP), etc.

The master gateway 520 communicates with the controller 560 to register information of the GS members and to resolve configuration issues amongst the member nodes of the GS. See the descriptions of FIGS. 6A and 8 for details of the GS registration. The backup gateway 530 and the slave gateway 540 may independently process data traffic pursuant to the configuration provided by the master 520, and notify the master 520 when necessary. See the descriptions of FIGS. 6A, and 9A through 9G, for details of the GS operation of processing NVO3 packets. When the master gateway 520 does not function properly, the backup gateway 530 takes over and becomes a new master of the GS 510, and a new backup is elected.

In one embodiment of the present invention, virtual machines of FIG. 5 including the master 520, the backup 530, the slave 540, and the overlay virtual machine (VM) 550, run on a respective hypervisor platform, which runs on a respective server/mainframe computer. The respective server/mainframe computer may be one of mainframes 61, RISC based servers 62, servers 63, and blade servers 64, storage devices 65, and networks and networking components 66 of FIG. 3, and/or combinations thereof, that implements the computing node 10, or the computer system 12 of FIG. 1. To negotiate standard/proprietary network protocols, the network application server software 67 of FIG. 3 is also employed. The respective hypervisor platform provides a complete virtual computing environment such as virtualization layer 70 of FIG. 3. In the same embodiment of the present invention, the GS is deployed to establish the IBM® Software Defined Network for Virtual Environments (SDN VE). (IBM is a registered trademark of International Business Machines Corporation, Armonk, N.Y., USA.)

Figure 6A:
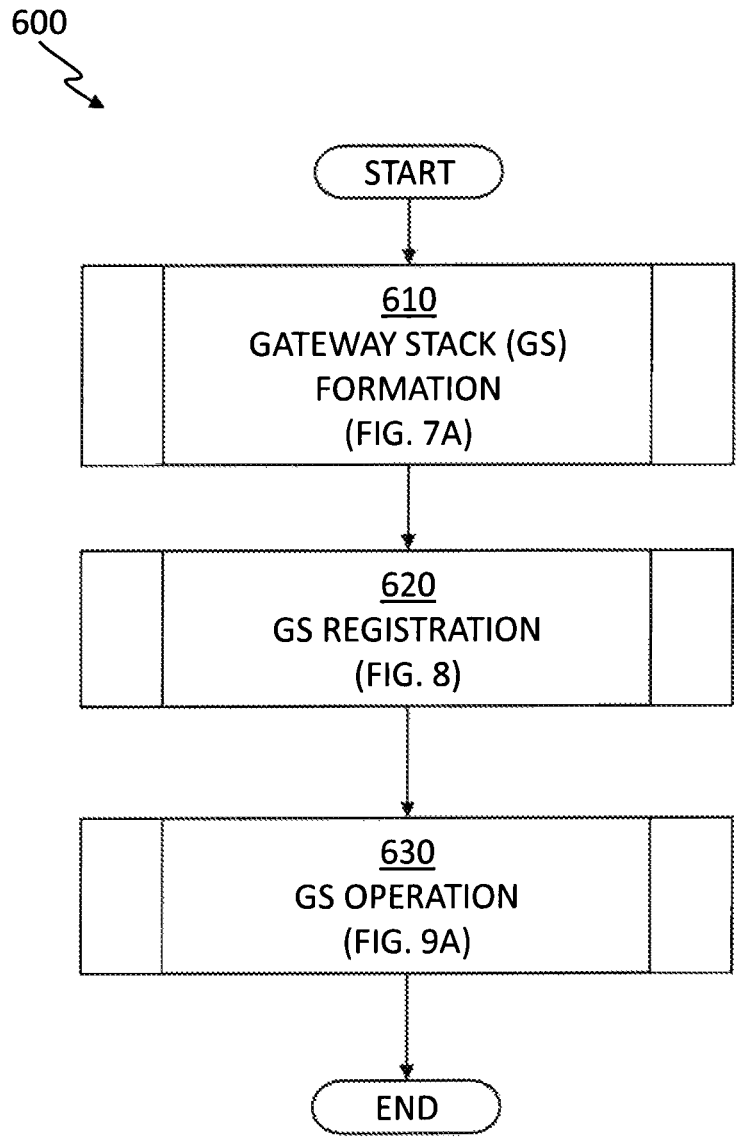
FIG. 6A depicts a top level flowchart of the gateway stack presented in FIGS. 4-5, in accordance with one or more embodiments set forth herein.

FIG. 6A depicts a top level flowchart 600 of the gateway stack (GS) 510 presented in FIGS. 4-5, in accordance with one or more embodiments set forth herein.

Block 610 "GS formation" illustrates that the GS 510 is formed amongst a group of gateways. See the description of FIG. 7A for details of GS formation as performed by each gateway participating in the GS 510. The GS formation process utilizes Hello Protocol run by a respective gateway of the GS 510, passing Hello Packets (FIG. 7B) back and forth. See the description of FIG. 7B for details of Hello Packet composition. In response to formation of the GS 510, participating gateways are assigned to a respective role, and the gateway elected as a master of the GS 510 during the GS formation drives registration and configuration of the gateways of the GS 510.

Block 620 "GS registration" illustrates that the GS 510 completes registration of the participating gateways with a controller/policy server of the GS 510 in response to the GS formation of block 610. The master registers the gateways with the controller/policy server, and configures the nodes for gateway services such that the GS 510 will virtually function as one logical gateway appliance regardless of the number of gateways participating in the GS 510. See the description of FIG. 8 for details of GS registration.

Block 630 "GS operation" illustrates that GS 510 performs gateway services in response to the registration completed in block 620. See the descriptions of FIGS. 9A through 9G for details of the GS operation.

Figure 6B:
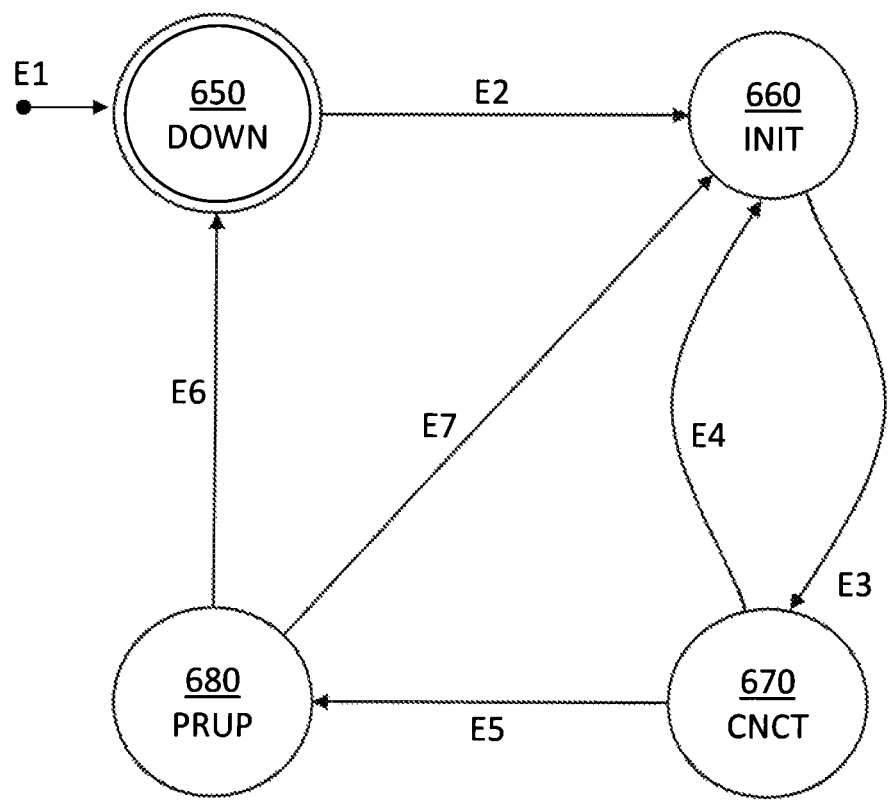
FIG. 6B depicts the finite state machine of a node participating in the gateway stack, in accordance with one or more embodiments set forth herein.

FIG. 6B depicts a finite state machine (FSM) of a node participating in the gateway stack (GS) 510, in accordance with one or more embodiments set forth herein.

In one embodiment of the present invention, the node of the GS 510 has four states: Down 650, Init 660, Connected (CNCT) 670, and Peer-Up (PRUP) 680.

Down 650 is the start state of the node, as represented by the double circle and Arrow E1. In Down 650 state, the node does not communicate with other nodes of the GS 510. When the node is enabled by a user/controller, which is an event indicated by Arrow E2, the state of the node evolves to Init 660.

Init 660 is a second state of the four states, in which the node begins communicating with other nodes according to Hello Protocol. In Init 660 state, the node periodically sends Hello packets to other nodes and continuously monitors reception of Hello packets sent by neighbor nodes. See the description of FIG. 7A for details of activity in executing the Hello Protocol. See the description of FIG. 7B for details of a Hello Packet. In response to the node ascertaining that a network identifier (NID) associated with the node is found in the Hello packets received from the neighbor nodes, which is an event indicated by Arrow E3, the state of the node evolves to Connected 670.

Connected 670 is a third state of the four states, in which the node prepares the operations of the GS 510 by electing a master and a backup amongst all participating nodes according to the Hello Protocol. In Connected 670 state, the node continues monitoring Hello packets received from neighbor nodes to check if the communication stays bidirectional. If the NID associated with the node is not found in the Hello packets received from the neighbor nodes, which is an event indicated by Arrow E4, the state of the node reverts to Init 660. In response to the node in Connected 670 state, provided the communication stays bidirectional, ascertaining that the master/backup/slave roles are respectively specified for nodes of the GS 510 and a management IP (mgmtIP) address has been assigned to the master for communication with the controller and/or the policy server, which is an event indicated by Arrow E5, the state of the node advances to Peer-Up 680.

As noted earlier, the term "member" is used to indicate a gateway/node other than a master, including a backup or a slave gateway/node, based on the result of the election.

Peer-Up 680 is the fourth and the most advanced state of the four states of the node, in which the nodes of the GS 510 operate as a logical gateway device. The master of the GS 510 first registers members of the GS 510 with the controller and/or the policy server, and synchronizes data with the members. See the description of FIG. 8 for details of the GS registration. In response to the GS registration is successfully completing, the GS 510 operates by processing NVO3 packets. See the descriptions of FIGS. 9A through 9G for details of the GS operation. In Peer-Up 680 state, the node continues monitoring activities, and in response to a timer specifying a permitted time duration without any activity expiring, referred to as "Timer Out", or in response to the node is not being able to communicate with a neighbor node, the state of the node reverts to Init 660, as the node is deemed disconnected, which is an event indicated by Arrow E7. Further in Peer-Up 680 state, if events indicated by Arrow E6 occurs, such as the node is turned off or GS 510 functionality is disabled, then the state of the node reverts to Down 650, as the node cannot service NVO3 packets.

Figure 7A:
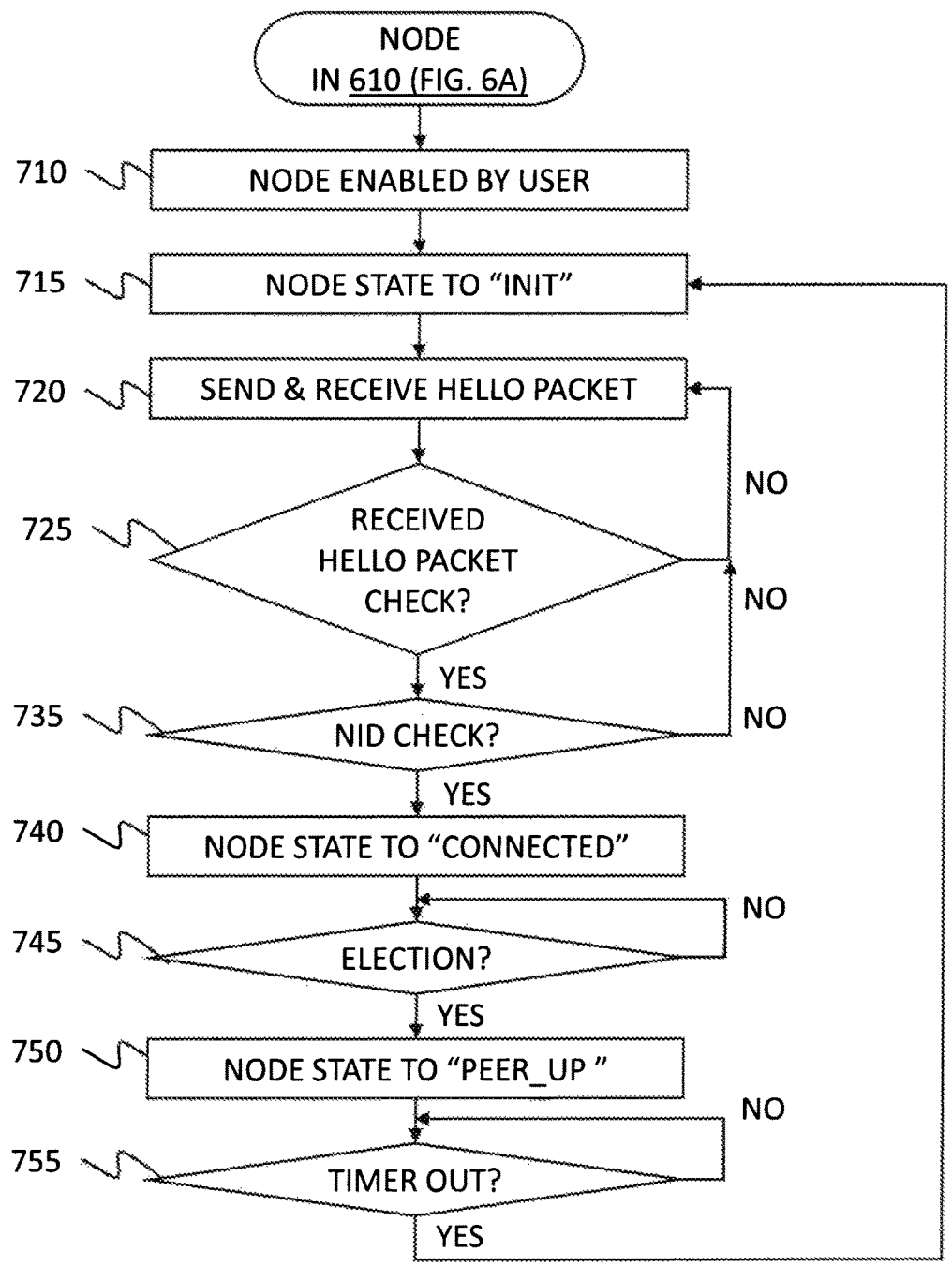
FIG. 7A is a detailed flowchart of block 610 in FIG. 6A, depicting Hello Protocol processes as performed by each node of the gateway stack (GS), in accordance with one or more embodiments set forth herein.

FIG. 7A is a detailed flowchart of block 610 in FIG. 6A, depicting Hello Protocol processes as performed by each node of the gateway stack (GS) 510, in accordance with one or more embodiments set forth herein. See the description of FIG. 7B for details on fields of a Hello Packet used for the Hello Protocol.

In block 710, the node detects a first event that a user enabled the node for the GS 510. Prior to block 710, the node is initially in "Down" state, in terms of the four states of FSM described in FIG. 6B. The node proceeds with block 715.

In block 715, the node changes the state of the node to "Init" state, in response to the first event of being enabled in block 710. The node proceeds with block 720.

The sequence corresponding to blocks 720, 725, and 735 of FIG. 7A are repeatedly performed while the node is in "Init" state, until the conditions of blocks 725 and 735 are satisfied, indicating that during "Init" state, the node periodically sends out Hello packets, and monitors and processes Hello packets coming from neighbor nodes to ascertain the node has established bidirectional communication with all other nodes in the GS 510.

In block 720, the node sends an initialized Hello Packet to a multicast destination IP address (dIP) 224.0.0.241, to send the Hello Packet to every other node of the GS 510. The Hello Packets are sent out once in a time period set by the value of HelloInterval field [R20:B0-B1] of FIG. 7B, of the Hello Packet. Responsive to other nodes of the GS 510 sending the Hello Packets, the node also receives Hello Packets from other nodes. The node proceeds with block 725.

In block 725, the node checks, in the received Hello Packet, if the multicast destination IP address (dIP) is set as 224.0.0.241 and the UDP destination port (dPort) is set as 10050, according to the values for dIP and dPort, respectively, predefined for the Hello Protocol. The source port number range corresponding to the dPort 10050 is [10052-10100]. If the node ascertains both that the dIP is 224.0.0.241 and that the dPort is 10050, then the node proceeds with block 735. Otherwise, the node discards the received Hello Packet and loops back to block 720.

In block 735, the node checks if the Hello Packet received in block 720 has a network identifier (NID) that uniquely identifies the node within the GS 510 listed in the Neighbor field, indicating that the node and the sender of the received Hello Packet had established bidirectional communication. If the node discovers the NID of the node in the received Hello Packets from all other nodes of the GS 510, then the node proceeds with block 740. Otherwise, the node loops back to block 720.

Blocks 720 is performed periodically pursuant to the value of HelloInterval field in the Hello Packet, and blocks 725 and 735 for examining received Hello Packets, which is performed for every incoming packet, may be performed concurrently, while the node is in "Init", "Connected", and "Peer-Up" states.

In block 740, the node changes the state of the node to "Connected" based on the conditions satisfied in blocks 725, 730, and 735, indicating that the node has established bidirectional communication with all other nodes in the GS 510. Then the node proceeds with block 745.

In block 745, the node determines if a master and a backup of the GS 510 have been elected by use of predefined election rules. In response to exchanging and processing Hello Packets with other nodes of the GS 510 in blocks prior to 745, the node examines a specific field of the Hello Packet selected by the predefined election rules and may determine which node should be the master/backup. All non-elected nodes become slaves within the GS 510. In one embodiment of the present invention, the node elects a first node having the greatest IP address as a master, and a second node having the second greatest IP address as a backup. Once the master and the backup are elected, the rest of the nodes in the GS 510 becomes slaves. In another embodiment of the present invention, the node elects a first node sending a first Hello Packet having the greatest value in the GwPriority field [R20:B3], FIG. 7B, of the first Hello Packet as a master, and a second node sending a second Hello Packet having the second greatest value in the GwPriority field [R20:B3], FIG. 7B, of the second Hello Packet as a backup. The node stays at block 745 until the node determines that the election is successfully completed while continuously examining incoming Hello Packets to see if values in the Master IP Address field (MasterIP[R36] of FIG. 7B) and the Backup IP Address field (BackupIP[R32] of FIG. 7B) are both non-zero, which indicates the election is completed. If the node determines that the election is completed, then the node proceeds with block 750.

In block 750, the node changes the state of the node to "Peer-Up", in which the GS 510 is successfully formed having bidirectional communication established among all participating nodes of the GS 510, and the master/backup/slave roles respectively assigned to each node of the GS 510. As noted earlier, in response to the master being elected in block 745, the backup and the slaves are referred to as a "member" during the GS registration and GS operation, in the descriptions of FIGS. 8, 9A, 9B, 9C, 9D, 9E, 9F, and 9G, hereinafter. As the GS formation is completed, a new Media Access Control (MAC) address for the GS 510 is automatically generated by a virtual network adapter in a virtual machine running the master node. Also, a Management IP Address (MgmtIP[R4] of FIG. 7B) is created for the GS 510 to communicate with the controller by the virtual machine running the master node. The node proceeds with block 755.

In block 755, the node checks whether or not an activity timer (DeadInterval [R24] of FIG. 7B) had expired. If the node determines that the activity timer has not expired, the node stays in "Peer Up" state and continues checking the activity timer in block 755. The GS 510 operates normally when each node participating in the GS 510 is respectively staying in block 755. If the node determines that the activity timer has expired, indicating that the node is no longer operational, then the node loops back to block 715, changing the state of the node to "Init". In another embodiment of the present invention, the node may change the state of the node to "Down", as noted in the description of FIG. 6B.

FIG. 7B depicts a format of a Hello Packet 790 used for the Hello Protocol described in FIG. 7A, in accordance with one or more embodiments set forth herein.

Field VersionNo [R0:B0] indicates a version number of the Hello Protocol of the Hello Packet, denoted as the VersionNo field. In one embodiment, VersionNo=1 specifies a present version, and VersionNo=2 is reserved for a future revision of the Hello Protocol.

Field PacketType [R0:B1] set to 1 to indicates that the present version of the Hello Protocol supports only Hello Packets.

Field PacketLength [R0:B2-B3] indicates the length of the Hello Packet in bytes.

Field MgmtIP [R4] is an IP address of a management interface which is used to send/receive Hello Packets.

Field Checksum [R8:B0-B1] indicates a standard IP checksum of the entire contents of the Hello Packet.

Field AuthType [R8:B2-B3] indicates the authentication procedure employed to authenticate the Hello Packet, for example, null authentication, MD5, text authentication, etc.

Field Authentication [R12] may indicate a 64-bit field used for the authentication scheme. In one embodiment of the present invention, the Authentication [R12] field is determined by the AuthType field.

Field NetMask [R16] indicates a network mask associated with this interface.

Field HelloInterval [R20:B0-B1] indicates a time lapse, in seconds, between two consecutive Hello Packets transmitted by a node on the management interface. The value of the HelloInterval field is advertised to neighboring nodes of the GS 510.

Field Options [R20:B2] indicates whether or not the node is set to support optional functionalities such as enabling a node to reject communication with a neighbor node that has distinctive optional functionalities from the node. In one embodiment, the Options field is set to 0 to indicate the node does not support optional functionalities.

Field GwPriority [R20:B3] holds a non-negative integer utilized to determine a master of the GS 510. A node having a greatest value in the GwPriority [R20:B3] field is to be elected as a master during the GS formation. Also, another node having the value zero (0) in the GwPriority [R20:B3] field is not eligible for a master of the GS 510. The value of the HelloInterval field is advertised to neighboring nodes of the GS 510.

Field DeadInterval [R24] indicates a duration of time, in seconds, in which the node may stay inactive while in the "Peer Up" state. In one embodiment of the present invention, where the node does not generate any traffic during a period set by the value of the DeadInterval field, neighboring nodes may declare the inactive node as in "Init" state. The value of the DeadInterval field is advertised to neighboring nodes of the GS 510.

Field VirtualIP [R28] indicates a virtual IP address of the GS 510, as created for the GS 510 to communicate with a controller and a policy server.

Field BackupIP [R32] indicates a virtual IP address of a node elected as a backup within the GS 510 by the Hello Protocol. The backup node takes over the GS 510 and becomes a master where the master node fails. The field BackupIP is initialized to 0.0.0.0 before the Hello Protocol runs, which indicates that no backup node has been elected yet.

Field MasterIP [R36] indicates a virtual IP address of a node elected as a master within the GS 510 by the Hello Protocol. The master node drives the registration of the GS 510 nodes with the controller, as well as controls traffic, synchronizes configuration with member nodes of the GS 510, etc., as described hereinafter. The field MasterIP is initialized to 0.0.0.0 before the Hello Protocol runs, which indicates that no master node has been elected yet. In response to the node being elected as master, values of the MasterIP and the VirtualIP fields are identical, as the GS 510 is represented by the virtual IP address of the master.

Field Neighbor [R40] indicates a list of participating nodes of the GS 510, which is formed by running the Hello Protocol. An "adjacency" relationship is established between master/backup and other nodes, except between two slave nodes of the GS 510.

The rest of the fields [R44] in the Hello Packet indicate neighbors that have not been listed.

Figure 8:
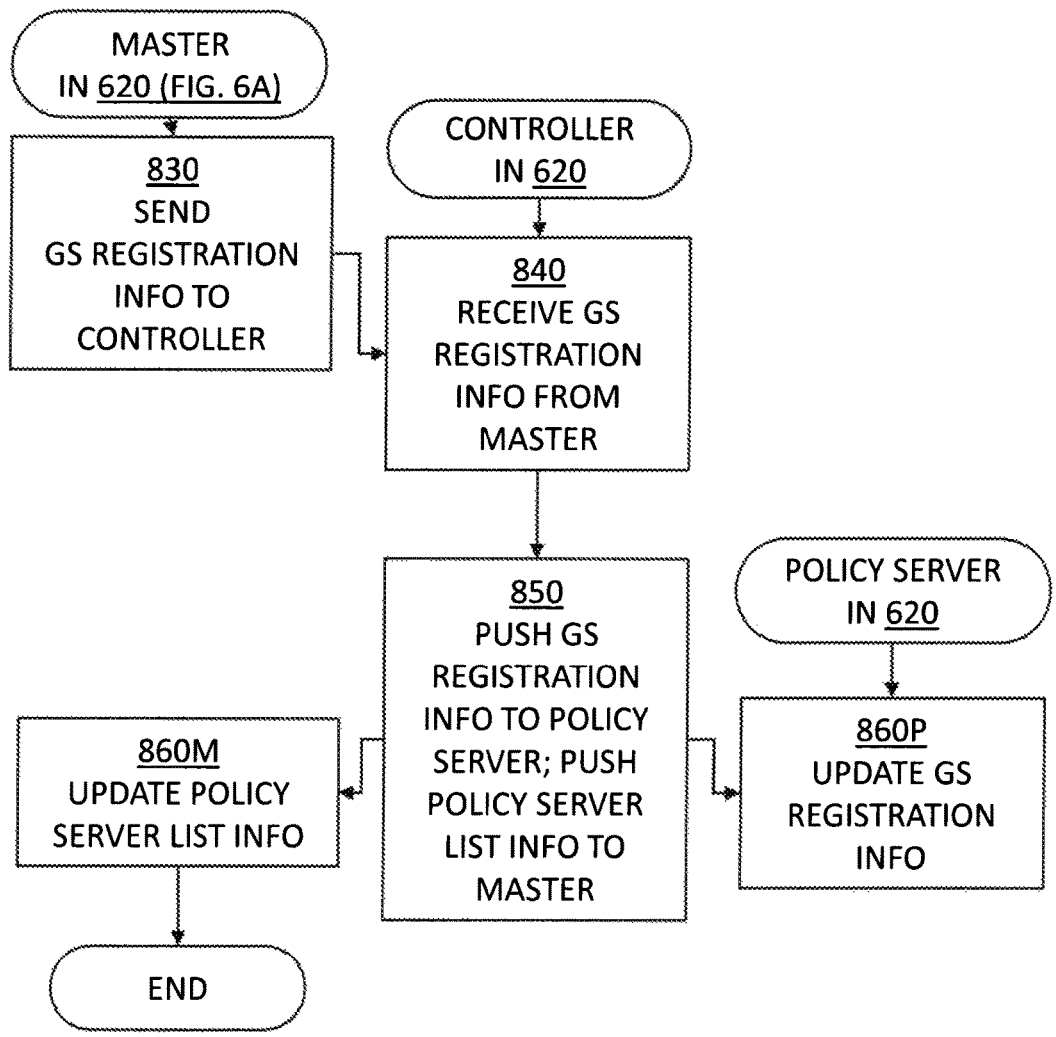
FIG. 8 is a detailed flowchart of block 620 in FIG. 6A, depicting the gateway stack registration process performed by the master of the GS, the controller and the policy server, in accordance with one or more embodiments set forth herein.

FIG. 8 is a detailed flowchart of block 620 in FIG. 6A, depicting the gateway stack registration process performed by the master of the GS 510, the controller and the policy server, in accordance with one or more embodiments set forth herein.

At the conclusion of block 610 of FIG. 6A, in response to the master being elected and the registration being completed, all participating nodes of the GS 510, members and the master alike, are represented by and accessed through one logical address as the GS 510, the value of the VirtualIP field in the Hello Packets. Even when the master is down, the backup takes over the master's place, and the GS 510 continues operation as the same logical device represented by the same logical address without triggering another round of the GS registration. The master synchronizes registration and/or configuration information of the GS 510 as necessary throughout the GS operations. Then the master proceeds with block 830.

In block 830, the master sends the GS registration information to the controller. In one embodiment of the present invention, a virtual tunnel IP address of the GS 510 is registered with the controller, as specified by the IBM® software-defined network for virtual environments (SDN VE). Then the master waits for the controller to respond.

In block 840, the controller receives the GS registration information sent from the master in block 830. Prior to block 840, as the nodes participating in the GS 510 may not be individually registered with the controller until the GS 510 is fully formed and the master is elected, the controller is not aware of any nodes, or the GS gateway appliance. In response to obtaining the GS registration information, the controller registers all of the participating nodes of the GS 510 as one gateway appliance for future data traffic accessible by the logical address of the master, virt_mgmt_ip, as shared by the master with the members. The controller remains unaware of how many nodes are participating in the GS 510, as well as other details of individual nodes, because the GS 510 is encapsulated and fully virtualized as one logical gateway appliance. Then the controller proceeds with block 850.

In block 850, the controller pushes, to a policy server, the GS registration information obtained in block 840 and pushes, to the master, by use of the virtual address registered in block 840, the policy server list information obtained from the policy server. The policy server list information includes information such as IP address of the overlay virtual machines (VMs), media access control (MAC) addresses of the overlay VMs, Tunnel End Point IP (TEP-IP) addresses of the overlay VMs, network-identifiers of the overlay VMs, etc. Then the controller concludes the GS registration and proceeds with the GS operation of block 630 in FIG. 6A, detailed in the flowcharts of FIGS. 9A through 9G.

In block 860P, the policy server, as forced by the controller from block 850, updates the GS registration information. Then the policy server concludes the GS registration and proceeds with the GS operation of block 630 in FIG. 6A, detailed in flowcharts of FIGS. 9A through 9G.

In block 860M, the master, as forced by the controller from block 850, updates the policy server list information. Then the master concludes the GS registration and proceeds with the GS operation of block 630 in FIG. 6A, detailed in the flowcharts of FIGS. 9A through 9G.

Figure 9A:
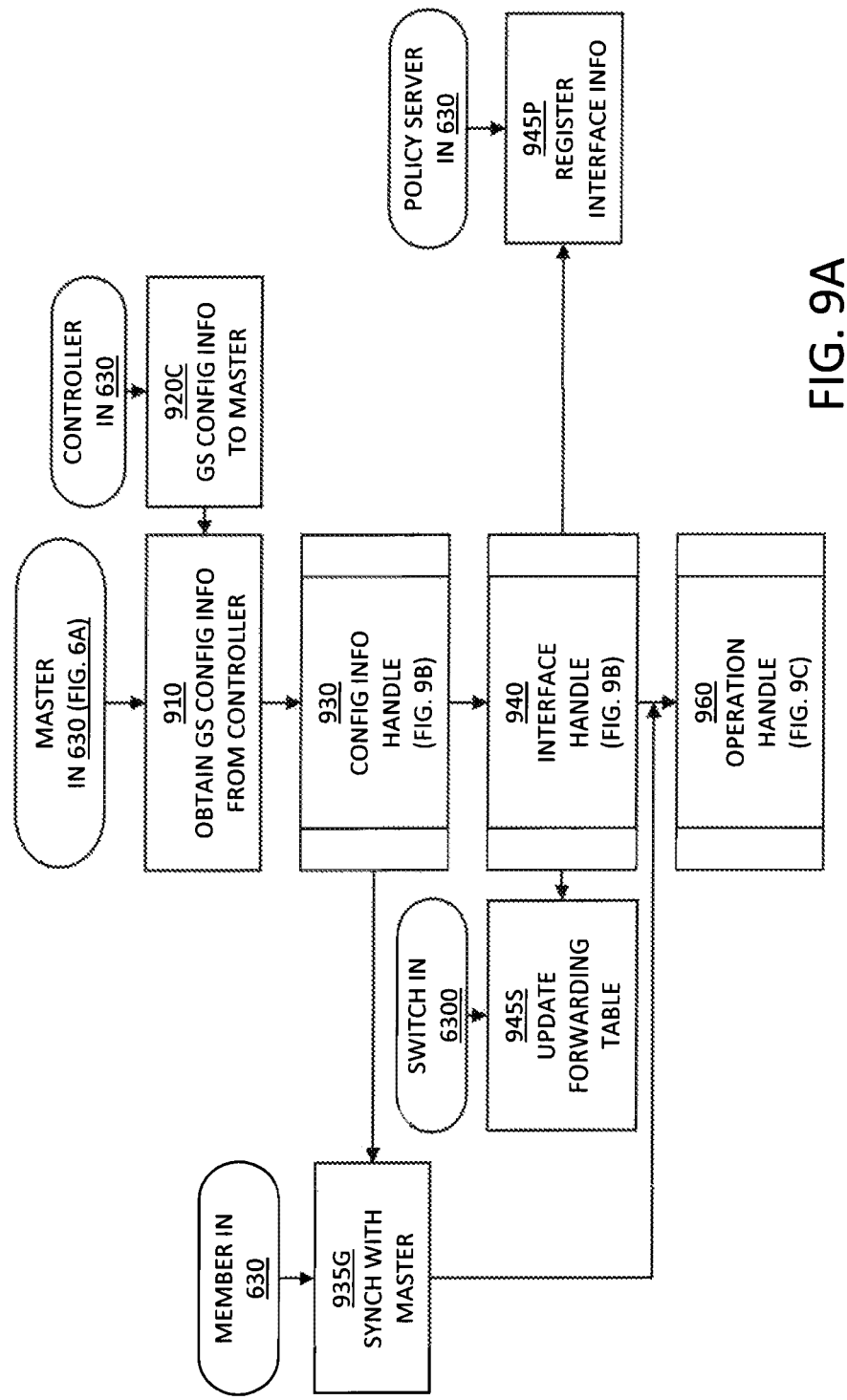
FIG. 9A is a detailed flowchart of block 630 in FIG. 6A, depicting the gateway stack operations performed by the master and members of the GS, the controller, the policy server and a switch, in accordance with one or more embodiments set forth herein.

FIG. 9A is a detailed flowchart of block 630 in FIG. 6A, depicting the gateway stack operations performed by the master and members of the GS 510, the controller, the policy server and a switch, in accordance with one or more embodiments set forth herein.

In block 910, the master requests and obtains the GS configuration information from the controller. Then the master proceeds with block 930.

In block 920C, the controller provides, to the master, the GS configuration information in response to the request for the GS configuration information as received from the master performing block 910. Then the controller interacts with the GS 510 only when another request is made to the controller.

In block 930, the master synchronizes the GS configuration information with the members of the GS 510. See the description of FIG. 9B for details of how the master handles the GS configuration information amongst the members of the GS 510. Then the master proceeds with block 940.

In block 935G, a member of the GS 510 synchronizes the GS configuration information with the master, as the GS configuration information is relayed from the master in block 930. See the description of FIG. 9B for details of how the member synchronizes the GS configuration information. Then the member proceeds with block 960 of regular GS operations.

In block 940, the master registers interfaces presented in the GS configuration information with the policy server and the switch. See the description of FIG. 9B for details of how the master handles the interfaces. Then the master proceeds with block 960.

In block 945P, the policy server registers the interface information sent from the master, wherein the interfaces have been updated according to the GS configuration information. See the description of FIG. 9B for details of block 945P. Then the policy server interacts with the GS 510 in response to a further request being made to the policy server.

In block 945S, the switch updates a forwarding table of the switch pursuant to the interface information from the master sent in block 940. See the description of FIG. 9B for details of block 945S. Then the switch interacts with the GS 510 in response to another forwarding table update being requested by the master.

In block 960, the master leads the GS 510 in regular operations of the GS 510 as the GS 510 is fully configured and functional as a gateway appliance. See the description of FIG. 9C for details of how the master functions in the regular operations of the GS 510. The master runs block 960 until the master changes the state to "Down" or the activity timer expires and changes the state to "Init".

FIG. 9B is a detailed flowchart of blocks 930 and 940 in FIG. 9A, as well as all blocks communicating with blocks 930 and 940, depicting how configuration and interface information is handled by the master and members of the GS 510, the policy server and the switch, in accordance with one or more embodiments set forth herein.

In block 9301, the master creates a configuration file for gateway services of the GS 510, based on the configuration information obtained from the controller. Wherein the GS 510 is deployed as a public gateway that is a Layer 3 gateway connecting to an external public network such as Internet, the configuration file includes Tunnel End Point IP (TEP-IP), External IP (EXT-IP), Source and Destination Network Address Translation (SNAT) pool and forwarding rules. Wherein the GS 510 is deployed as a legacy gateway that is a Layer 2 gateway connecting to a legacy network such as Data center, the configuration file includes TEP-IP and VLAN mappings. Active dynamic session information is stored in a database/storage of the master. Then the master proceeds with block 9302.

In block 9302, the master creates interfaces necessary for the gateway service pursuant to the configuration file generated in block 9301. In one embodiment of the present invention, the master creates interfaces of the TEP-IP and EXT-IP, SNAT pool, forwarding rules and VLAN mapping. Then the master proceeds with block 9303.

In block 9303, the master synchronizes respective configuration files of each member of the GS 510 with the configuration file created from block 9301. Then the master proceeds with block 9404.

In block 9351G, each member of the GS 510 updates a respective configuration file based on the synchronization request from the master in block 9303. Then each member installs interfaces for the respective node based on the updated configuration file in block 9352G. Accordingly, each member gateway has all the interfaces of the configuration file installed such that each member gateway is capable of supporting communication in the TEP-IP and EXT-IP, SNAT pool, forwarding rules and VLAN mapping and the dynamic sessions. Then each member of the GS 510 is ready to service traffic as a NVO3 gateway.

In block 9404, the master registers a Tunnel End Point (TEP) IP address with the policy server. The GS 510 is associated with the TEP-IP address that serves a Layer 3 (L3) connectivity to a destination external to the overlay network. Tunneling enables the encapsulation of a packet from one type of protocol within the datagram of a different protocol. For example, a Virtual Private Network (VPN) uses Point-to-Point Tunneling Protocol (PPTP) to encapsulate IP packets over a public network, such as the Internet. In one embodiment of the present invention, a human administrator interacting with the controller configures the TEP-IP of the GS 510. When the master takes the configuration information from the controller in block 910 of FIG. 9A, the master acquires the TEP-IP and then propagates the TEP-IP to members of the GS 510 in blocks 9301, 9302, and 9303. Then the master proceeds with block 9405.

In block 9451P, in response to the master performing block 9404, the policy server registers the TEP-IP interface information of the master such that the GS 510 may service as a NVO3 gateway. Then the policy server interacts with the GS 510 only in response to another request being made to the policy server.

In block 9405, the master sends out Address Resolution Protocol (ARP) packets, to advertise destination addresses the GS 510 may handle. Then the master proceeds with 960 of FIG. 9A, which is detailed in FIG. 9C.

In block 9452S, the switch receives the ARP packet sent by the master in block 9405. Then in block 9453S, the switch updates a forwarding table of the switch according to the address information of the received ARP packet. Then the switch interacts with the GS 510 only in response to another request being made to the switch.

Figure 9C:
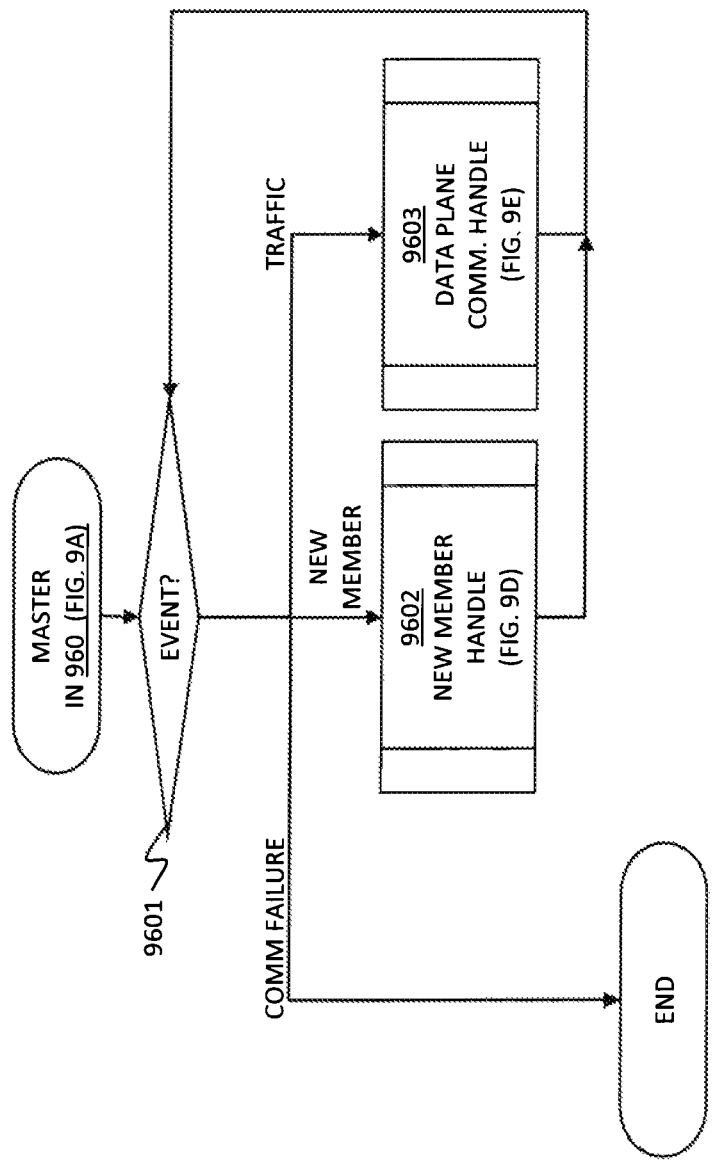
FIG. 9C is a detailed flowchart of block 960 in FIG. 9A, depicting how the master handles regular gateway services requested of the GS, in accordance with one or more embodiments set forth herein.

FIG. 9C is a detailed flowchart of block 960 in FIG. 9A, depicting how the master handles regular gateway services requested of the GS 510, in accordance with one or more embodiments set forth herein.

In block 9601, the master determines a type of the event occurring along the GS operation. If the master cannot communicate with the members of the GS 510 because of any reason such as power-off or link-down, the master node changes the state of the node to "Down" or "Init" state. Then the backup node takes over as a new master of the GS 510, the VirtualIP address for the GS 510 is assigned to the new master, and the GS 510 continues providing gateway services. As noted earlier, when the backup takes over the master, the GS registration information stays the same as before, and consequently, there is no need to interact with the controller. Also, because the policy server communicates with the GS 510 by use of the VirtualIP address, in response to the backup being assigned with the VirtualIP address, the GS 510 may communicate with the policy server without intervention by the controller. The master may be reinstated and join the GS 510 later on according to administrative decisions.

If the master determines that there is a new member to join the GS 510 in block 9601, then the master proceeds with block 9602. See the description of FIG. 9D for details of how the master adds the new member to the GS 510. In response to the new member joining the GS 510, the master loops back to block 9601.

If the master determines that the GS 510 has traffic to provide gateway services in block 9601, then the master proceeds with block 9603. See the description of FIG. 9E for details of how the GS 510 handles traffic. In response to the traffic being properly handled, the master loops back to block 9601.

Figure 9D:
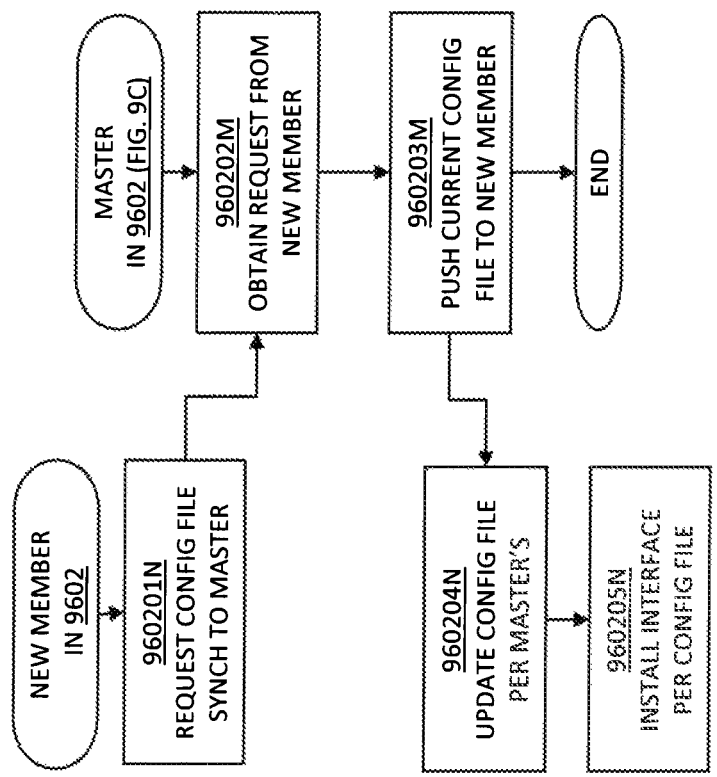
FIG. 9D is a detailed flowchart of block 9602 of FIG. 9C, depicting how a new member joins the GS, as performed by the master, the new member, the controller, and the policy server, in accordance with one or more embodiments set forth herein.

FIG. 9D is a detailed flowchart of block 9602 of FIG. 9C, depicting how a new member joins the GS 510, as performed by the master, the new member, the controller, and the policy server, in accordance with one or more embodiments set forth herein.

Prior to block 960201N, a new gateway hardware is prepared offline, without any configuration information, by a human administrator. The new gateway hardware may be a new computer system, or a gateway hardware previously used for the GS 510 after reset of the configuration information.

In block 960201N, the new member requests the master to synchronize the configuration file via a management network using stacking header encapsulation in the OSI protocol stack. Then the new member waits for the response from the master.

In block 960202M, the master obtains the request sent in block 960201N from the new member. Then the master proceeds with block 960203M.

In block 960203M, the master pushes a configuration file of the master node to the new member from block 960202M. The configuration file of the master is up-to-date and configures all interfaces necessary for gateway services of the GS 510. Then the master concludes block 9602 as the new member successfully joined the GS 510.

In block 960204N, the new member updates the configuration file of the new member according to the configuration file of the master, as received from block 960203M. Then the new member installs interfaces of the updated configuration file in block 960205N. Then the new member waits until the master concludes the joining process of block 9602.

Figure 9E:
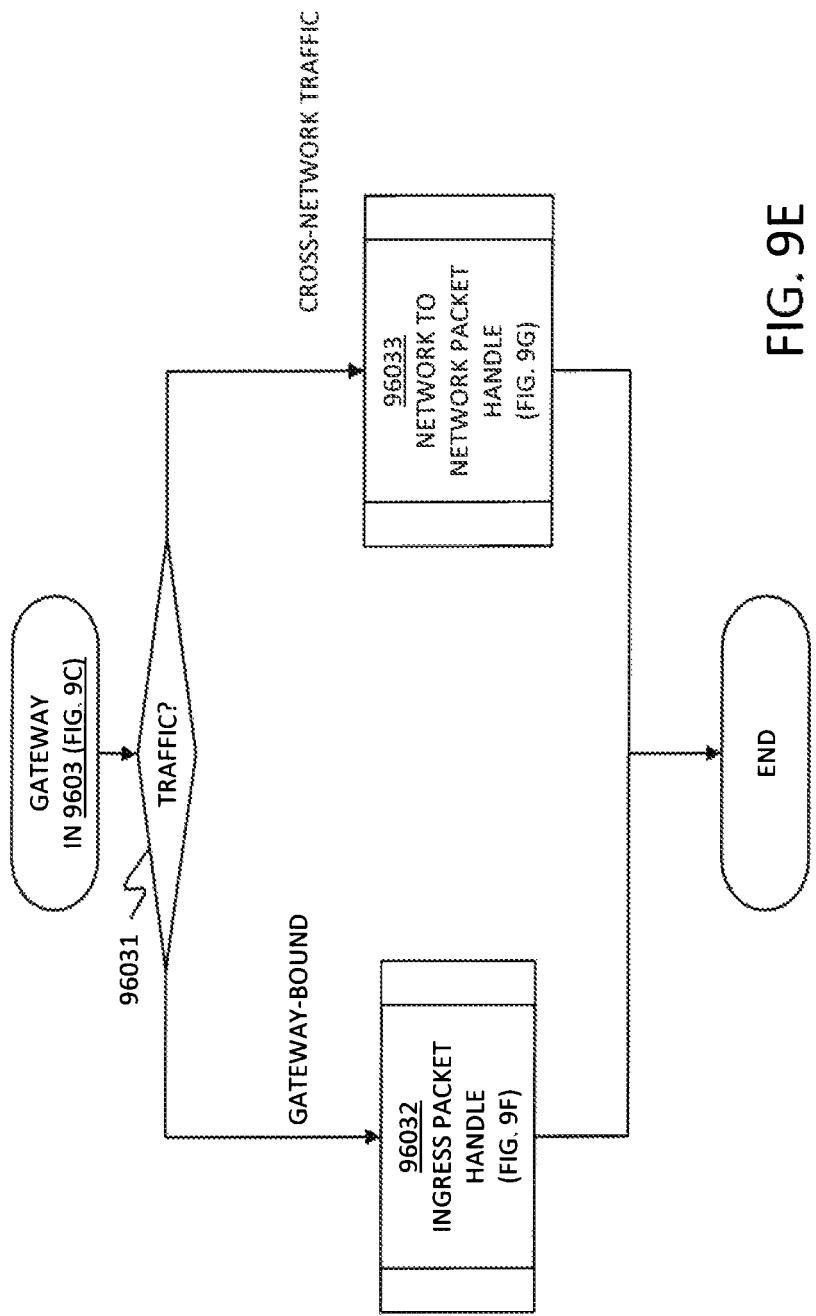
FIG. 9E is a detailed flowchart of block 9603 of FIG. 9C, depicting how traffic is handled by the GS as performed by the master and a member, collectively referred to as a gateway, in accordance with one or more embodiments set forth herein.

FIG. 9E is a detailed flowchart of block 9603 of FIG. 9C, depicting how traffic is handled by the GS 510 as performed by the master and a member, collectively referred to as a gateway, in accordance with one or more embodiments set forth herein.

In block 96031, the gateway detects traffic on the port of the gateway and determines the type of the traffic detected. If the gateway determines that the next hop of the traffic is the GS 510, then the gateway proceeds with block 96032 to process ingress traffic. See the description of FIG. 9F for details of the ingress traffic process. If the gateway determines that the traffic is heading to the switch/external network, then the gateway proceeds with block 96033 to process network to network traffic. See the description of FIG. 9G for details of how the GS 510 handles the network-to-network traffic.

Figure 9F:
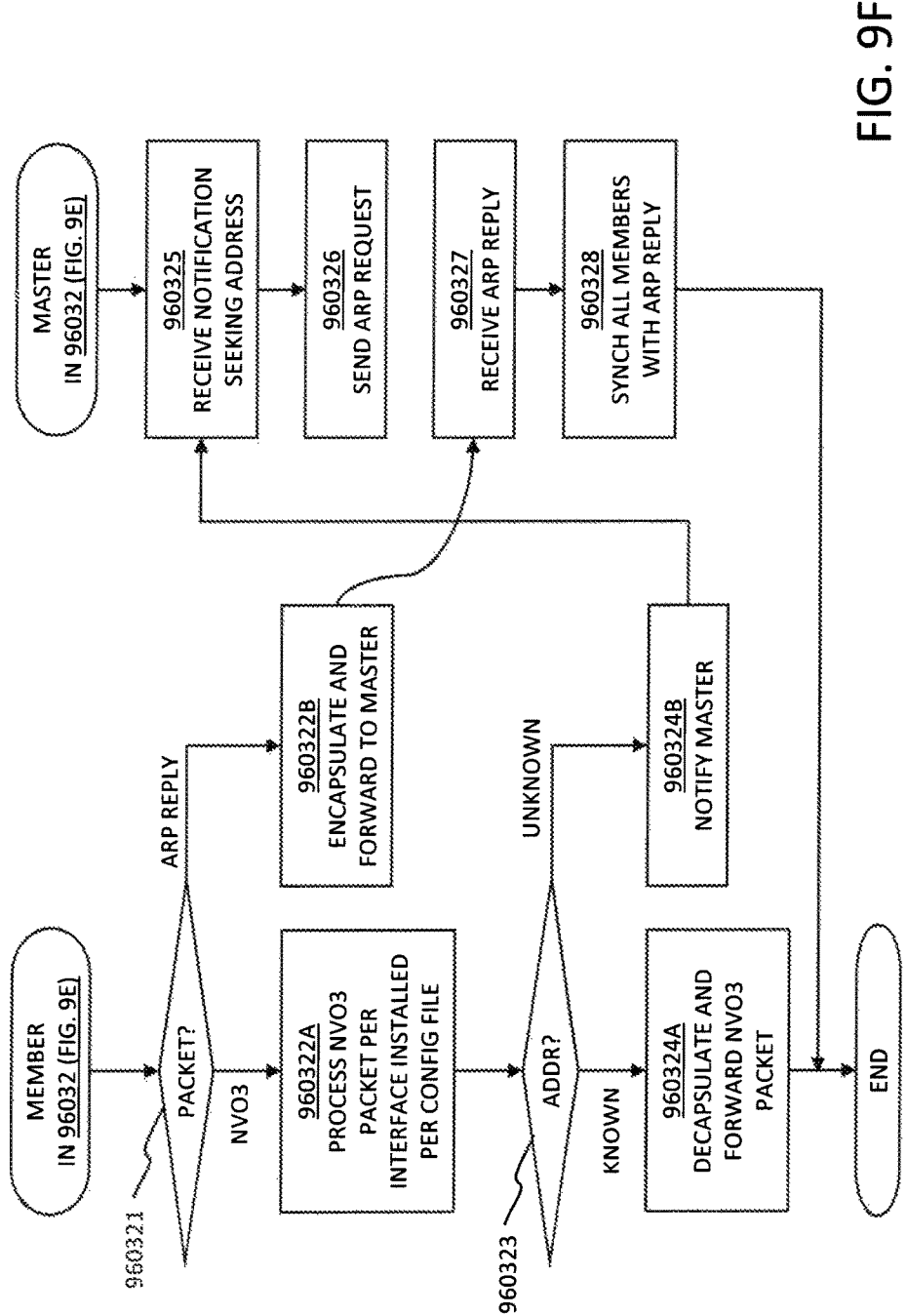
FIG. 9F is a detailed flowchart of block 96032 of FIG. 9E, depicting how ingress traffic is handled by the GS as performed by the master and a member, in accordance with one or more embodiments set forth herein.

FIG. 9F is a detailed flowchart of block 96032 of FIG. 9E, depicting how ingress traffic is handled by the GS 510 as performed by the master and a member, in accordance with one or more embodiments set forth herein.

Prior to block 960321, the switch ports, coupling the external network to network interface cards (NICs) of computer systems running the GS 510, are aggregated beforehand by method of static trunk such that any packet heading to the GS 510 may be received by any node of the GS 510. Conversely, uplink ports on the NICs of the GS 510 to the external switch may be also aggregated by various techniques such as NIC teaming, according to the need. By use of a static trunk on the external switch on the interface to the GS 510, if a data packet is incoming to the GS 510, hereinafter referred to as an ingress packet, the external switch hashes the packet on the static trunk, and, as a result, the ingress packet is forwarded to any node of the GS 510. The static trunk on the external switch enables the GS 510 to be utilized to the fullest in processing traffic, in contrast with conventional redundant gateways where a backup idles while a master alone processes traffic. The processes of FIG. 9F does not describe cases of normal Ethernet packet traffic as the external switch forwards normal Ethernet packets to the external network based on the MAC address table or the forwarding table of the external switch.

In block 960321, the member determines a type of the ingress packet. If the member determines that the ingress packet is a Network Virtualization over Layer 3 (NVO3) packet other than an Address Resolution Protocol (ARP) reply, then the member proceeds with block 960322A. If the member determines that the ingress packet is an ARP reply, then the member proceeds with block 960322B.

In block 960322A, the member processes the NVO3 packet according to the interfaces installed pursuant to the configuration file. In one embodiment of the present invention, the members respectively have TEP-IP, EXT-IP, SNAT pool, forwarding rules, and virtual local area network (VLAN) mapping installed on the node, according to blocks 930 and 940 of FIG. 9A, and FIG. 9B. Then the member proceeds with block 960323.

In block 960322B, the member encapsulates the ARP reply and forwards the encapsulated ARP reply to the master. As the ARP reply is received in response to a previous ARP request, the master may have sent out the previous ARP request, but the ARP reply was likely to arrive at the member because the master and the member use an identical Virtual IP address for the GS 510. For the master to resolve address/routing information in the ARP reply, the member forwards the ARP reply to the master.

In block 960323, the member examines the address of the ingress packet. If the member determines that the member knows the forwarding address of the ingress packet as the member had previously learned the address from the master according to the ARP, then the member proceeds with block 960324A. If the member determines that the member does not know the forwarding address of the ingress packet because it is the first time the member has handled the forwarding address, then the member proceeds with block 960324B.

In block 960324A, the member decapsulates the NVO3 packet and forwards the decapsulated NVO3 packet to an external switch on the way to the address, as the member knows the forwarding address. Then the member concludes processing the ingress packet.

In block 960324B, the member notifies the master that the forwarding address of the NVO3 packet is unknown. The GS 510 is a gateway capable of routing any packet, and the unknown address is resolved by the master according to the Address Resolution Protocol (ARP). Then the member concludes processing the ingress packet.

In block 960325, the master receives a notification seeking an unknown address from the member in block 960324B. Then the master proceeds with block 960326.

In block 960326, the master sends an ARP request to query a next hop MAC address for the unknown address as notified in block 960325. In one embodiment of the present invention, the ARP request includes EXT-IP for source IP, and the MAC for the GS 510 as source MAC. Then the master waits until the ARP reply is received from the member in block 960322B, or an ARP reply arrives in the port of the master.

In block 960327, the master receives the ARP reply responding to the ARP request sent in block 960326. The ARP reply comprises address information of the unknown address of block 960325. Then the master proceeds with block 960328.

In block 960328, the master synchronizes members of the GS 510 with the address information acquired from the ARP reply such that next time the same address is examined, the members may process the packet without notifying the master for the unknown address. Then the master concludes processing the ingress packet.

FIG. 9G is a detailed flowchart of block 96033 of FIG. 9E, depicting how cross-network traffic is handled by the GS 510 as performed by the master and a member, in accordance with one or more embodiments set forth herein.

In block 9603301, the member examines the type of packet. Wherein the external network attempts to access the NVO3 network serviced by the GS 510, the external network first sends an ARP request for the MAC address of the GS 510. The ARP request travels to the external switch, and to the ports of any node of the GS 510, according to the static trunk deployed for the interface from the external switch to the GS 510. If the member determines that the packet is an NVO3 packet, then the member proceeds with block 9603302A. If the member determines that the packet is an ARP request, then the member proceeds with block 9603302B.

In block 9603302A, the member processes the NVO3 packet according to the interfaces of TEP-IP and EXT-IP, SNAT pool, forwarding rules and VLAN mapping installed in the node pursuant to the configuration file, as unified throughout the nodes of the GS 510. Then the member proceeds with block 9603303, wherein the member notifies the master via the management network.

In block 9603302B, the member encapsulates the ARP request by stacking on the packet header and notifies the master.

In block 9603304, in response to the notifications from the member in blocks 9603302B and 9603303, the master determines the type of event notified by the member. If the master determines that the notification is for the ARP request from block 9603302B, then the master proceeds with block 9603305. If the master determines that the notification is for the NVO3 packet from block 9603303, then the master proceeds with block 9603308.

In block 9603305, the master processes the ARP request notification. Then the master proceeds with block 9603306.

In block 9603306, the master synchronizes members of the GS 510 with a MAC address of an external network in the ARP request notified such that the synchronized members may directly forward NVO3 packets to the MAC address in the future. Then the master proceeds with block 9603307.

In block 9603307, the master sends, to the external network, an ARP reply corresponding to the ARP request. Then the master concludes the cross-network traffic process.

In block 9603308, the master looks up the destination address from the policy server. Then the master proceeds with block 9603309.

In block 9603309, the master determines whether or not the destination address has been found in the policy server from block 9603308. If the master determines that the destination address has not been found in the policy server, then the master proceeds with block 9603310A. If the master determines that the destination address has been found in the policy server, then the master proceeds with block 9603310B.

In block 9603310A, the master sends out an ARP request to query the destination in the NVO3 network as the destination address has not been found in the policy server. Then the master concludes the cross-network traffic process.

In block 9603310B, the master encapsulates the NVO3 packet using TEP-IP and forwards the encapsulated NVO3 packet to the external switch as the destination address has been found from the policy server. Then the master concludes the cross-network traffic process.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A method for providing a distributed virtual gateway for Network Virtualization over a Layer 3 (NVO3) network, the method comprising:
   forming a gateway stack (GS) comprising at least three (3) nodes, wherein the GS is an instance of the distributed virtual gateway, wherein the GS is formed amongst the nodes pursuant to a gateway stack protocol (GSP) running on each of the nodes, such that the GS provides Layer 2 or Layer 3 gateway services in a fail-safe manner by utilizing all of the nodes in the GS, wherein the formed GS has a master, a backup, and at least one slave respectively elected for each of the nodes, and wherein the master communicates with a controller and a policy server via a management interface, and the GS is coupled to a switch via a data interface;
   registering the GS with the controller and the policy server such that the controller keeps GS registration information data, and the policy server keeps policy server list information data;
   configuring the nodes of the registered GS such that all nodes are enabled to autonomously process an inbound NVO3 data packet having a destination address known to a receiving node; and
   operating the GS, responsive to an associated type of a data packet and respective changes in an environment of the GS,
   wherein the data interface between the GS and the switch is aggregated by a static trunk such that the switch evenly distributes inbound data packets amongst the nodes of the GS.

2. The method of claim 1, said forming comprising:
   responsive to obtaining, in a first state, an instruction to enable a node of the at least three nodes from a user, setting the node to a second state such that the node commences communicating with other nodes in the GS;
   multicasting a first GSP packet to all of the nodes in the GS according to a packet interval period, wherein the packet interval period is specified in a GSP packet field;
   receiving a second GSP packet sent from another node of the at least three nodes;
   responsive to ascertaining, in the second state, that the node established a bidirectional communication channel with the another node from said receiving, setting the node to a third state such that the node elects the master, the backup and said at least one slave;
   responsive to ascertaining, in the third state, that the master and the backup were elected amongst the nodes pursuant to the GSP, setting the node to a fourth state such that the node begins processing data packets; and
   responsive to ascertaining, in the fourth state, that the node had not received any data packets for a duration of time set in a GSP packet inactivity timer field, setting the node to the second state.

3. The method of claim 2, wherein the GS enters an initialized state in response to all nodes in the GS having entered the second state, wherein the GS enters a connected state in response to all nodes in the GS having enter the third state, and wherein the GS enters a peer-up state in which the GS provides Layer 2 or Layer 3 gateway services in response to all nodes in the GS having entered the fourth state indicating that all nodes in the GS are capable of processing the first type of data packet.

4. The method of claim 2, wherein said ascertaining, in the second state, that the node established the bidirectional communication channel with said another node comprises:
   determining both that multicast destination Internet Protocol (IP) address of the received second GSP packet is set as 224.0.0.241, and that the User Datagram Protocol (UDP) destination port of the received second GSP packet is set as 10050; and
   determining that a neighbor field of the received second GSP packet includes a network identifier corresponding to the node.

5. The method of claim 2, wherein electing the master and the backup comprises:
   discovering a master GSP packet having a greatest priority value amongst all gateway priority values, by examining a respective gateway priority field of received GSP packets pursuant to the GSP;
   electing a first node that had sent the master GSP packet as the master;
   discovering a backup GSP packet having a second greatest priority value amongst all gateway priority values, by examining a respective gateway priority field of received GSP packets pursuant to the GSP;
   electing a second node that had sent the backup as the backup; and
   electing all nodes of the GS other than the master and the backup as one or more slaves.

6. The method of claim 2, wherein said ascertaining, in the third state, that the master and the backup were elected amongst the nodes comprises:
   determining that a master address field of the received second GSP packet has a first IP address that is valid and identical to a virtual address field of the received second GSP packet, wherein the master address field and the virtual address field of all GSP packets are initialized as zero (0) prior to election; and determining that a backup address field of the received second GSP packet has a second IP address that is distinctive from the first IP address.

7. The method of claim 1, said registering, by the master, comprising:
sending the GS registration information data of the master to the controller; and
updating the policy server list information data of the master, in response to pushing, by the controller, the policy server list information data as retrieved from the policy server.

8. The method of claim 7, wherein the GS registration information data comprises a virtual tunnel IP address of the GS pursuant to a specification of software defined network for virtual environments (SDN VE) that is serviced by the GS.

9. The method of claim 7, wherein the policy server list information data comprises an IP address of an overlay virtual machine (VM) coupled to the GS via the switch, a media access control (MAC) address of an overlay VM, a Tunnel End Point IP (TEP-IP) address of the overlay VM, a network identifier of the overlay VM.

10. The method of claim 1, said configuring, by the master, comprising:
creating a configuration file for gateway services of the GS, pursuant to the GS registration information data obtained from the controller;
creating interfaces corresponding to the created configuration file;
synchronizing respective configuration files of the backup and each slave;
registering a Tunnel End Point IP (TEP-IP) address of the GS with the policy server such that the GS provides the Layer 3 gateway services to a destination external to the NVO3 network by encapsulation; and
sending out Address Resolution Protocol (ARP) messages to the switch.

11. The method of claim 10, said creating the configuration file comprising:
determining that the GS is deployed as a Layer 3 gateway servicing an external public network; and
recording the configuration file listing gateway services for Tunnel End Point IP (TEP-IP), External IP (EXT-IP), Source and Destination Network Address Translation (SNAT) pool, and forwarding rules.

12. The method of claim 10, said creating the configuration file comprising:
determining that the GS is deployed as a Layer 2 gateway servicing a legacy network for tenants; and
recording the configuration file listing gateway services for Tunnel End Point IP (TEP-IP) and virtual local area network (VLAN) mappings.

13. The method of claim 10, said creating interfaces comprising:
setting interfaces of the master comprising Tunnel End Point IP (TEP-IP), External IP (EXT-IP), Source and Destination Network Address Translation (SNAT) pool, forwarding rules, virtual local area network (VLAN) mappings, and dynamic sessions.

14. The method of claim 10, said synchronizing, performed by the backup and said at least one slave, comprising:
responsive to said synchronizing by the master, updating the respective configuration files of respective node of the backup and said at least one slave; and
installing interfaces on respective node pursuant to the updated respective configuration file.

15. The method of claim 1, wherein a first change in the environment of the GS from said operating is a failure on the data interface, the management interface, or a node of the master, triggering the backup to take over as a new master pursuant to the GSP, without updating the GS registration information data of the controller, and without updating the policy server list information data of the policy server.

16. The method of claim 1, wherein a second change in the environment of the GS from said operating is a new node joining the GS, the method further comprising:
requesting, by the new node, the master to synchronize a configuration file of the new member;
in response to obtaining a configuration file from the master as requested, updating a configuration file of the new node; and
installing interfaces on the new node pursuant to the updated configuration file.

17. The method of claim 1, said operating comprising:
determining a direction of the data packet, the direction selected from the group consisting of inbound and cross-network;
determining a type of the data packet, the type selected from the group consisting of an NVO3 packet, an Address Resolution Protocol (ARP) request, and an ARP reply;
wherein the data packet is of inbound direction and NVO3 packet type, processing, by the receiving node, the data packet according to interfaces installed in the receiving node, decapsulating, and, in response to ascertaining that the destination address is known to the receiving node, forwarding the data packet to a destination,
wherein the data packet is of inbound direction and ARP reply type, encapsulating, by the receiving node, and forwarding the data packet to the master,
wherein the data packet is of cross-network direction and NVO3 packet type, processing, by the receiving node, the data packet according to interfaces installed in the receiving node, and notifying the data packet to the master, and
wherein the data packet is of cross-network direction and ARP request type, encapsulating, by the receiving node, the data packet and notifying the data packet to the master.

18. The method of claim 17, said operating further comprising:
wherein the data packet is of inbound direction and NVO3 packet type, receiving, by the master, a notification that the destination address is unknown, in response to ascertaining by the receiving node that the destination address is unknown to the receiving node, then sending out an ARP request to query the destination address,
wherein the data packet is of inbound direction and ARP reply type, receiving, by the master, the data packet, in response to said forwarding by the receiving node, then synchronizing all nodes of the GS with data of the data packet,
wherein the data packet is of cross-network direction and NVO3 packet type, sending out, by the master, a new data packet of ARP request type, in response to ascertaining that the destination address has not been discovered in the policy server list information data,
wherein the data packet is of cross-network direction and NVO3 packet type, encapsulating, by the master, and forwarding the data packet to the destination address, in response to ascertaining that the destination address has been discovered in the policy server list information data, and wherein the data packet is of cross-network direction and ARP request type, processing, by the master, the data packet, synchronizing all nodes of the GS with data of the data packet, and sending another new data packet of ARP reply type to an external network coupled to the switch.

19. A computer program product comprising:

a computer readable storage medium readable by one or more processor and storing instructions for execution by the one or more processor for performing a method for providing a distributed virtual gateway for Network Virtualization over Layer 3 (NVO3) network, the method comprising:

forming a gateway stack (GS) comprising at least three (3) nodes, wherein the GS is an instance of the distributed virtual gateway, wherein the GS is formed amongst the nodes pursuant to a gateway stack protocol (GSP) running on each of the nodes, such that the GS provides Layer 2 or Layer 3 gateway services in a fail-safe manner by utilizing all of the nodes in the GS, wherein the formed GS has a master, a backup, and at least one slave respectively elected for each of the nodes, and wherein the master communicates with a controller and a policy server via a management interface, and the GS is coupled to a switch via a data interface;

registering the GS with the controller and the policy server such that the controller keeps GS registration information data, and the policy server keeps policy server list information data;

configuring the nodes of the registered GS such that all nodes are enabled to autonomously process an inbound NVO3 data packet having a destination address known to a receiving node; and operating the GS, responsive to an associated type of a data packet and respective changes in an environment of the GS, wherein the data interface between the GS and the switch is aggregated by static trunk such that the switch evenly distributes inbound data packets amongst the nodes of the GS.

20. A system comprising:

a memory;

one or more processor in communication with memory; and program instructions executable by the one or more processor via the memory to perform a method for providing a distributed virtual gateway for Network Virtualization over Layer 3 (NVO3) network, the method comprising:

forming a gateway stack (GS) comprising at least three (3) nodes, wherein the GS is an instance of the distributed virtual gateway, wherein the GS is formed amongst the nodes pursuant to a gateway stack protocol (GSP) running on each of the nodes, such that the GS provides Layer 2 or Layer 3 gateway services in a fail-safe manner by utilizing all of the nodes in the GS, wherein the formed GS has a master, a backup, and at least one slave respectively elected for each of the nodes, and wherein the master communicates with a controller and a policy server via a management interface, and the GS is coupled to a switch via a data interface;

registering the GS with the controller and the policy server such that the controller keeps GS registration information data, and the policy server keeps policy server list information data;

configuring the nodes of the registered GS such that all nodes are enabled to autonomously process an inbound NVO3 data packet having a destination address known to a receiving node; and operating the GS, responsive to an associated type of a data packet and respective changes in an environment of the GS, wherein the data interface between the GS and the switch is aggregated by static trunk such that the switch evenly distributes inbound data packets amongst the nodes of the GS.

* * * * *